(12) United States Patent
Arakawa et al.

(10) Patent No.: US 10,308,118 B2
(45) Date of Patent: Jun. 4, 2019

(54) VEHICLE AND CONTROL METHOD THEREFOR

(71) Applicant: TOYOTA JIDOSHA KABUSHIKI KAISHA, Toyota-shi, Aichi-ken (JP)

(72) Inventors: Ryota Arakawa, Miyoshi (JP); Shinichiro Minegishi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/933,612

(22) Filed: Mar. 23, 2018

(65) Prior Publication Data

US 2018/0281596 A1 Oct. 4, 2018

(30) Foreign Application Priority Data

Mar. 28, 2017 (JP) .................. 2017-063616

(51) Int. Cl.
| | |
|---|---|
| B60W 10/08 | (2006.01) |
| B60L 3/00 | (2019.01) |
| B60L 9/18 | (2006.01) |
| B60L 11/14 | (2006.01) |
| B60W 10/06 | (2006.01) |
| B60W 20/20 | (2016.01) |
| H02P 27/04 | (2016.01) |
| B60K 6/448 | (2007.10) |
| B60L 50/16 | (2019.01) |

(52) U.S. Cl.
CPC ............ *B60L 3/0061* (2013.01); *B60K 6/448* (2013.01); *B60L 9/18* (2013.01); *B60L 11/14* (2013.01); *B60L 50/16* (2019.02); *B60W 10/06* (2013.01); *B60W 10/08* (2013.01); *B60W 20/20* (2013.01); *H02P 27/04* (2013.01); *B60L 2210/30* (2013.01); *B60L 2260/44* (2013.01); *B60W 2710/081* (2013.01); *B60W 2710/083* (2013.01); *B60Y 2200/92* (2013.01); *B60Y 2400/112* (2013.01); *B60Y 2400/61* (2013.01); *B60Y 2400/73* (2013.01); *Y02T 10/6239* (2013.01); *Y02T 10/6286* (2013.01); *Y02T 10/7077* (2013.01); *Y02T 10/7241* (2013.01)

(58) Field of Classification Search
CPC ....................................................... B60W 10/08
See application file for complete search history.

(56) References Cited

U.S. PATENT DOCUMENTS

2017/0129478 A1  5/2017  Minegishi

FOREIGN PATENT DOCUMENTS

| JP | 2007-244126 A | 9/2007 |
| JP | 2017-087840 A | 5/2017 |

*Primary Examiner* — Bentsu Ro
(74) *Attorney, Agent, or Firm* — Sughrue Mion, PLLC

(57) ABSTRACT

When a vehicle is traveling in a state in which an abnormality has occurred in a second resolver, a PWM control unit periodically calculates an estimated electrical angle value of a second motor generator and generates a control command for an inverter using the estimated electrical angle value. The estimated electrical angle value in each cycle can be calculated by correcting an electrical angle estimation error with respect to a sum of an estimated rotation angle change value between cycles and an estimated electrical angle value in a previous cycle. The PWM control unit generates the control command for the inverter such that an output of the inverter is a constant potential while an absolute value of the electrical angle estimation error is greater than a predetermined value during traveling of the vehicle.

3 Claims, 11 Drawing Sheets

VEHICLE AND CONTROL METHOD THEREFOR

CROSS-REFERENCE TO RELATED APPLICATIONS

The disclosure of Japanese Patent Application No. 2017-063616 filed on Mar. 28, 2017 including the specification, drawings, and abstract is incorporated herein by reference in its entirety.

BACKGROUND

1. Technical Field

The present disclosure relates to a vehicle and a control method therefor, and more particularly, to control when an abnormality occurs in a rotation angle sensor that detects a rotation angle of a motor generator mounted in a vehicle.

2. Description of Related Art

Japanese Patent Application Publication No. 2007-244126 (JP 2007-244126 A) discloses a control method when an abnormality occurs in a rotation angle sensor (a resolver) that detects a rotation angle of a motor generator mounted in a vehicle. The vehicle described in JP 2007-244126 A includes first and second motor generators from which a driving force for the vehicle can be acquired and first and second resolvers that detect rotation speeds (rotation angles) of the first and second motor generators.

Limp form traveling which is performed when one of the first and second resolvers is inoperative is described in JP 2007-244126 A. For example, when the resolver of the second motor generator is inoperative, limp form traveling is realized by stopping driving of an inverter for controlling the second motor generator and inputting power from an engine and the normal first motor generator to a power split device (a planetary gear set) (see JP 2007-244126 A).

SUMMARY

In the limp form traveling described in JP 2007-244126 A, the vehicle continues to travel while shutting down the inverter for driving the motor generator of which the resolver has an abnormality occurring therein and prohibiting output of a torque from the motor generator. However, since the motor generator of which the resolver has an abnormality occurring therein is not used, various constraints are applied to traveling of the vehicle.

Therefore, it is conceivable that the motor generator of which the resolver has an abnormality occurring therein may continue to be used by estimating an electrical angle of the motor generator and using the estimated value of the electrical angle for control of the motor generator. However, when the inverter for driving the motor generator is controlled based on an electrical angle with a large estimation error, until the estimated value of the electrical angle converges, there is a large phase difference between an output voltage of the inverter and a counter-electromotive force (a voltage) generated in the motor generator and thus there is a likelihood that an overcurrent will flow in the inverter.

In consideration of the above-mentioned problem, the present discloser provides a vehicle and a control method therefor in which an overcurrent flowing in an inverter for driving a motor generator can be curbed while continuously using the motor generator in traveling of the vehicle when an abnormality has occurred in a rotation angle sensor that detects a rotation angle of the motor generator.

Therefore, according to an aspect of the present disclosure, there is provided a vehicle including: a motor generator that includes a permanent magnet in a rotor; an output shaft that is mechanically connected to driving wheels of the vehicle; a planetary gear set; an inverter, a power storage device, a rotation angle sensor, a current sensor, and further an electronic control unit. The planetary gear set is mechanically connected to at least the output shaft and a rotary shaft of the motor generator. The inverter is configured to drive the motor generator. The power storage device is configured to transmit and receive electric power to and from the motor generator via the inverter. The rotation angle sensor is configured to detect a rotation angle of the motor generator. The current sensor is configured to detect a current flowing in the motor generator. The electronic control unit is configured: when the vehicle is traveling in a state in which an abnormality has occurred in the rotation angle sensor, (i) to periodically calculate an estimated rotational angular velocity value of the motor generator from a gear ratio of the planetary gear set and a rotation speed of a rotary shaft of the planetary gear set other than the rotary shaft connected to the motor generator; (ii) to periodically calculate an estimated electrical angle value by integrating an estimated rotation angle change value which is calculated from the estimated rotational angular velocity value; (iii) to periodically generate a control command for the inverter based on the estimated electrical angle value in each cycle which is calculated by correcting an electrical angle error estimated and calculated from the control command for the inverter and a detected current value from the current sensor with respect to a sum of the estimated rotation angle change value between cycles and the estimated electrical angle value in a previous cycle; (iv) to generate a control command for the inverter such that an output of the inverter is a constant potential while an absolute value of the electrical angle error is greater than a predetermined value from start of output control of the motor generator; and (v) to control the output of the motor generator based on the control command for the inverter.

In the vehicle, the electronic control unit may be configured to generate the control command such that an output voltage of the inverter becomes zero while the absolute value of the electrical angle error is greater than the predetermined value from the start of the output control of the motor generator during traveling of the vehicle when an abnormality has occurred in the rotation angle sensor.

According to another aspect of the present disclosure, there is provided a control method for a vehicle. The vehicle includes: a motor generator that includes a permanent magnet in a rotor; an output shaft that is mechanically connected to driving wheels of the vehicle; a planetary gear set that is mechanically connected to at least the output shaft and a rotary shaft of the motor generator; an inverter configured to drive the motor generator; a rotation angle sensor configured to detect a rotation angle of the motor generator; and a current sensor configured to detect a current flowing in the motor generator. The control method includes: when the vehicle is traveling in a state in which an abnormality has occurred in the rotation angle sensor, (i) periodically calculating an estimated rotational angular velocity value of the motor generator from a gear ratio of the planetary gear set and a rotation speed of a rotary shaft of the planetary gear set other than the rotary shaft connected to the motor generator; (ii) periodically calculating an estimated electrical angle value by integrating an estimated rotation angle change value which is calculated from the estimated rotational angular velocity value; (iii) periodically generating a control command for the inverter based on the estimated electrical angle value in each cycle which is calculated by correcting an electrical angle error estimated and calculated from the control command for the inverter and a detected current value from the current sensor with respect to a sum of the estimated rotation angle change value between cycles and the estimated electrical angle value in a previous cycle; (iv) generating the control command for the inverter such that an output of the inverter is a constant potential while an absolute value of the electrical angle error is greater than a predetermined value from start of output control of the motor generator; and (v) controlling the output of the motor generator based on the control command for the inverter.

With the above-mentioned vehicle and the control method therefor, it is possible to perform output control (resolverless control) using the estimated electrical angle value. Particularly, since the estimated electrical angle value is corrected using the electrical angle error estimated and calculated from the control command for the inverter and an actually detected current value during the output control (resolverless control) under an influence of the error of the estimated electrical angle value, it is possible to enhance estimation accuracy of an electrical angle. Accordingly, when an abnormality has occurred in the rotation angle sensor of the motor generator, the vehicle can travel in accordance with a torque output from the motor generator (that is, power consumption or power generation).

In the vehicle, while the estimation error of the electrical angle is large, the control command for the inverter is generated such that the output of the inverter is a constant potential, and thus only a current corresponding to a counter-electromotive force generated in the motor generator due to traveling of the vehicle flows in the inverter. Accordingly, with the vehicle and the control method therefor, it is possible to curb an overcurrent in the inverter for driving the motor generator while continuously using the motor generator during traveling of the vehicle when an abnormality has occurred in the rotation angle sensor.

With the vehicle and the control method therefor according to the present disclosure as described above, it is possible to curb an overcurrent flowing in an inverter for driving a motor generator while continuously using the motor generator in traveling of the vehicle when an abnormality has occurred in a rotation angle sensor that detects a rotation angle of the motor generator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
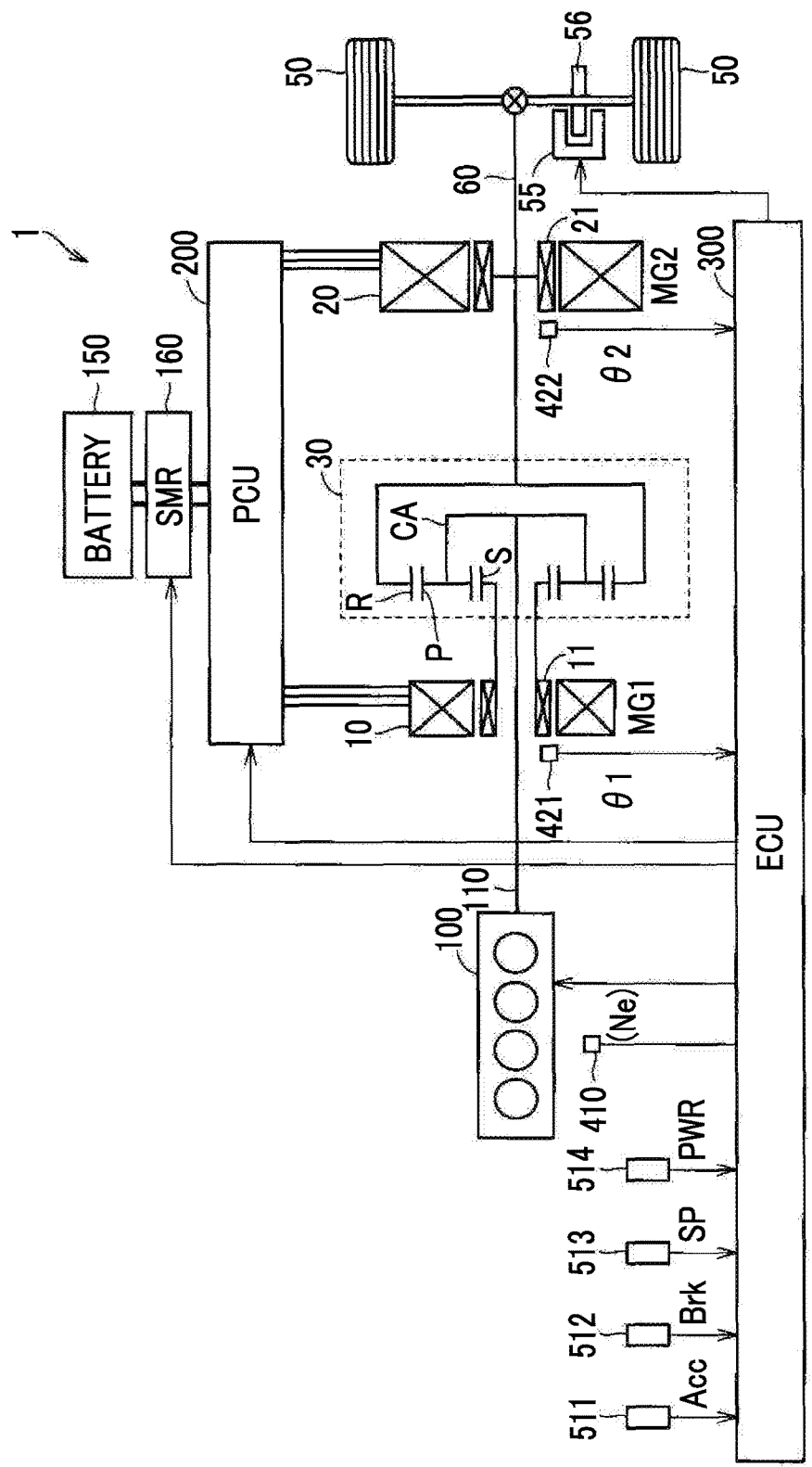
FIG. 1 is a block diagram schematically illustrating an entire configuration of a hybrid vehicle which is an example of a vehicle according to an embodiment of the present disclosure.

Hereinafter, an embodiment of the present disclosure will be described in detail with reference to the accompanying drawings. The same or corresponding elements in the drawings will be referenced by the same reference signs and description thereof will not be repeated in principle.

First, an entire configuration of a vehicle will be described below. FIG. 1 is a block diagram schematically illustrating an entire configuration of a hybrid vehicle which is an example of a vehicle according to an embodiment of the present disclosure. Referring to FIG. 1, the vehicle 1 includes an engine 100, a first motor generator 10, a second motor generator 20, a planetary gear set 30, driving wheels 50, an output shaft 60 connected to the driving wheels 50, a battery 150, a system main relay (SMR) 160, a power control unit (PCU) 200, and an electronic control unit (ECU) 300.

As will be described later in detail, the vehicle 1 can switch a traveling mode of the vehicle 1 between electric vehicle traveling (EV traveling) in which the engine 100 is stopped and the vehicle travels using power of the motor generator 20 and hybrid vehicle traveling (HV traveling) in which the engine 100 is operated and the vehicle travels using power of the engine 100 and the motor generator 20.

The engine 100 is an internal combustion engine that converts thermal energy based on combustion of fuel into mechanical energy. The engine 100 generates power for causing the vehicle 1 to travel as a rotational force of a crank shaft 110 in accordance with a control signal from the ECU 300. The crank shaft 110 is connected to the planetary gear set 30.

A rotation detection sensor 410 that detects a rotational position (a crank angle) of the crank shaft 110 is provided in the engine 100. A signal indicating a detection result of the rotation detection sensor 410 is output to the ECU 300. A rotation speed of the engine 100 (an engine rotation speed) Ne can be detected based on a rate of change of the rotational position detected by the rotation detection sensor 410.

Each of the first motor generator 10 and the second motor generator 20 is constituted by, for example, a three-phase AC permanent magnet type synchronous motor. That is, a rotor 11 of the first motor generator 10 (MG1) and a rotor 21 of the second motor generator 20 (MG2) include a permanent magnet.

The first motor generator 10 rotates the crank shaft 110 of the engine 100 using electric power from the battery 150 when starting the engine 100. The first motor generator 10 can also generate electric power using power of the engine 100. AC power generated by the first motor generator 10 is converted into DC power by the PCU 200 and charges the battery 150. AC power generated by the first motor generator 10 may be supplied to the second motor generator 20.

The rotor 21 of the second motor generator 20 is mechanically connected to the output shaft 60. In the example illustrated in FIG. 1, the rotor 21 is directly connected to the output shaft 60, but the rotor may be mechanically connected to the output shaft 60 via a transmission (a reduction gear).

The second motor generator 20 rotates the output shaft 60 using at least one of electric power supplied from the battery 150 and electric power generated by the first motor generator 10. The second motor generator 20 can also generate electric power by regenerative braking. AC power generated by the second motor generator 20 is converted into DC Power by the PCU 200 and charges the battery 150.

A brake device 55 as a mechanical brake is additionally provided in the vehicle 1. For example, the brake device 55 is configured to hinder rotation of the driving wheels 50 with a frictional force generated by pressing a brake pad (not illustrated) against a disc-shaped brake disc 56 using a hydraulic pressure or the like in response to a control command from the ECU 300. In this way, in the vehicle 1, a braking force responsive to a user's operation of a brake pedal (not illustrated) is secured in combination with a regenerative braking force from the second motor generator 20 and a mechanical braking force from the brake device 55.

A first resolver 421 is provided in the first motor generator 10. The first resolver 421 detects a rotation angle θ1 of the first motor generator 10, and outputs a signal indicating the detection result to the ECU 300. A rotation speed (MG1 rotation speed) Nm1 of the first motor generator 10 can be detected from a rate of change of the rotation angle θ1 detected by the first resolver 421.

A second resolver 422 is provided in the second motor generator 20. The second resolver 422 detects a rotation angle θ2 of the second motor generator 20, and outputs a signal indicating the detection result to the ECU 300. A rotation speed (MG2 rotation speed) Nm2 of the second motor generator 20 can be detected from a rate of change of the rotation angle θ2 detected by the second resolver 422.

The planetary gear set 30 includes a sun gear S, a ring gear R, a carrier CA, and a pinion gear P as rotary elements. The sun gear S is connected to the rotor 11 of the first motor generator 10. The ring gar R is connected to the output shaft 60. The pinion gear P engages with the sun gear S and the ring gear R. The carrier CA is connected to the crank shaft 110 of the engine 100 and holds the pinion gear P such that the pinion gear P rotates on its axis and revolves therearound. As a result, the crank shaft 110 of the engine 100, the rotor 11 of the first motor generator 10, and the output shaft 60 connected to the rotor 21 of the second motor generator 20 are mechanically connected to each other by the planetary gear set 30. Accordingly, the vehicle 1 is configured to deliver a torque to the engine 100, the first motor generator 10, and the output shaft 60 (the second motor generator 20). Particularly, regarding three shafts including the crank shaft 110, the rotor 11 of the first motor generator 10, and the output shaft 60 (the rotor 21 of the second motor generator 20) which are connected by the planetary gear set 30, it is known that, when the power (or a rotation speed) input or output to or from two axes is determined, the power input or output to or from the remaining one axis may be determined based on the power input or output to or from the other two axes.

The battery 150 is described as a representative example of a power storage device configured to be rechargeable. The battery 150 is representatively constituted by a secondary battery such as a nickel-hydride secondary battery or a lithium-ion secondary battery. A capacitor such as an electrical double layer capacitor can also be used as the power storage device. A voltage (hereinafter also referred to as a "battery voltage") VB of the battery 150 is a high voltage which ranges, for example, from about 200 V to 300 V.

The SMR 160 is interposed between and connected to power lines between the battery 150 and the PCU 200. The SMR 160 switches between an electrically connected state and an electrically disconnected state between the battery 150 and the PCU 200 in accordance with a control signal from the ECU 300.

The PCU 200 steps up electric power supplied from the battery 150, converts the electric power into AC power, and supplies the AC power to the first motor generator 10 and the second motor generator 20. The PCU 200 converts AC power generated by the first motor generator 10 and the second motor generator 20 into DC power and supplies the DC power to the battery 150. That is, the battery 150 can transmit and receive (input and output) electric power to and from the first motor generator 10 and the second motor generator 20 via the PCU 200. The configuration of the PCU 200 will be described later in detail with reference to FIG. 2.

The vehicle 1 further includes an accelerator pedal sensor 511, a brake pedal sensor 512, a vehicle speed sensor 513, and a power switch 514. The accelerator pedal sensor 511 detects an amount of depression Acc of an accelerator pedal (not illustrated) due to a driver. When the accelerator pedal is not depressed, the accelerator pedal depression amount Acc is zero. The brake pedal sensor 512 detects an amount of depression Brk of a brake pedal (not illustrated) due to a driver. The vehicle speed sensor 513 detects a speed of the vehicle 1, that is, a vehicle speed SP. The detected values of the accelerator pedal sensor 511, the brake pedal sensor 512, and the vehicle speed sensor 513 are input to the ECU 300.

The power switch 514 is operated when a driver instructs starting or ending of an operation of the vehicle. When the power switch 514 is operated by a user, a signal PWR is input to the ECU 300 and thus the ECU 300 can detect that the power switch 514 has been operated based on the signal PWR.

For example, the ECU 300 recognizes that the vehicle 1 is in a "ready-ON state" when the power switch 514 is operated in a state in which a driver depresses the brake pedal in an operation stop state. In the read-ON state, the SMR 160 is turned on, the battery 150 and the PCU 200 are electrically connected to each other, and the vehicle 1 enters a travelable state based on an operation of the accelerator pedal.

On the other hand, when the driver operates the power switch 514 in the ready-ON state, the vehicle 1 changes to the operation stop state (a read-OFF state). In the ready-OFF state, the SMR 160 is turned off, the battery 150 and the PCU 200 are electrically disconnected from each other, and the vehicle 1 enters a non-travelable state.

The ECU 300 includes a central processing unit (CPU), a memory, and an input/output buffer, none of which is illustrated in the drawing. The ECU 300 controls various devices such that the vehicle 1 is in a desired traveling state based on signals from various sensors and devices and maps and programs stored in the memory. Various control is not limited to processing by software, and may be performed by dedicated hardware (an electronic circuit).

Figure 2:
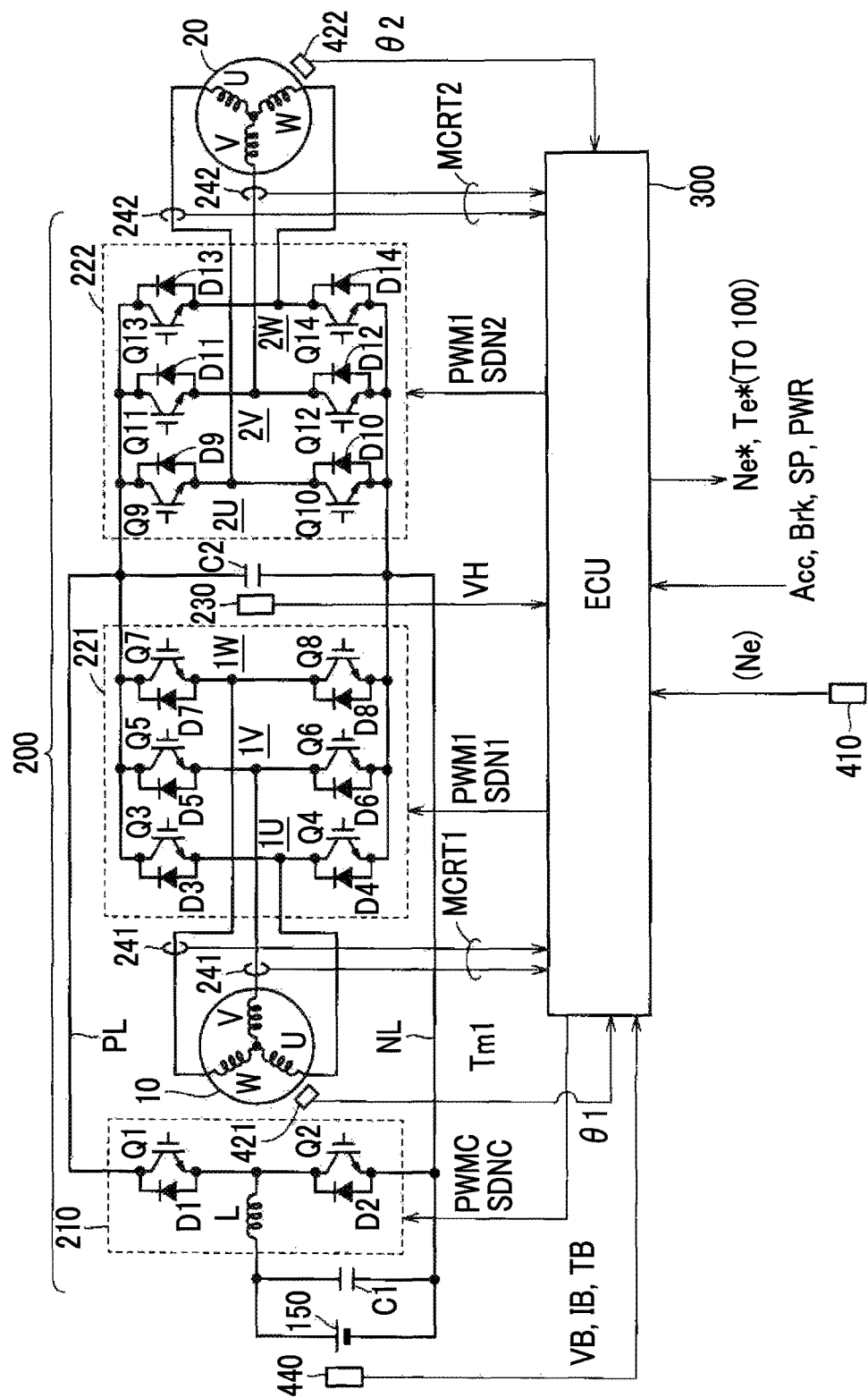
FIG. 2 is a circuit block diagram illustrating a configuration of an electrical system of the vehicle according to the embodiment of the present disclosure.

A configuration of an electrical system will be described below. FIG. 2 is a circuit block diagram illustrating a configuration of an electrical system of the vehicle 1. Referring to FIG. 2, the PCU 200 includes a capacitor C1, a converter 210, a capacitor C2, a first inverter 221, a second inverter 222, a voltage sensor 230, a first current sensor 241, and a second current sensor 242.

A monitoring unit 440 is provided in the battery 150. The monitoring unit 440 detects a battery voltage VB, an input/output current (a battery current) IB of the battery 150, and a temperature (a battery temperature) TB of the battery 150 and outputs signals indicating the detection results to the ECU 300. The capacitor C1 is connected in parallel to the battery 150. The capacitor C1 smoothes the battery voltage VB and supplies the smoothed battery voltage to the converter 210.

The converter 210 steps up the battery voltage VB in accordance with a control signal from the ECU 300 and supplies the stepped-up voltage to the power lines PL and NL. The converter 210 steps down DC voltages of the power lines PL and NL supplied from one or both of the first inverter 221 and the second inverter 222 and charges the battery 150 in accordance with a control signal from the ECU 300.

More specifically, the converter 210 is constituted by a so-called boost chopper and includes a reactor L, switching elements Q1 and Q2, and diodes D1 and D2. Each of the switching elements Q1 and Q2 and switching elements Q3 to Q14 which will be described later is an insulated gate bipolar transistor (IGBT). The switching elements Q1 and Q2 are connected in series to each other between the power line PL and the power line BL. Each of the diodes D1 and D2 is connected in anti-parallel between the collector and the emitter of the corresponding switching elements Q1 and Q2.

The capacitor C2 is connected between the power line PL and the power line NL. The capacitor C2 smoothes a DC voltage supplied from the converter 210 and supplies the smoothed voltage to the first inverter 221 and the second inverter 222.

The voltage sensor 230 detects a voltage across both ends of the capacitor C2, that is, a voltage (hereinafter also referred to as a "system voltage") VH between the power lines PL and NL connecting the converter 210 and the first inverter 221, and outputs a signal indicating the detection result to the ECU 300.

When the system voltage VH is supplied, the first inverter 221 converts the DC voltage into an AC voltage and drives the first motor generator 10 in accordance with a control signal from the ECU 300. Accordingly, the first motor generator 10 is controlled by the first inverter 221 such that a torque corresponding to a torque command value is generated.

The first inverter 221 includes a U-phase arm 1U, a V-phase arm 1V, and a W-phase arm 1W. The phase arms are connected in parallel between the power line P1 and the power line NL. The U-phase arm 1U includes the switching elements Q3 and Q4 which are connected in series to each other. The V-phase arm 1V includes the switching elements Q5 and Q6 which are connected in series to each other. The W-phase arm 1W includes the switching elements Q7 and Q8 which are connected in series to each other. The diodes D3 to D8 are connected in anti-parallel between the collectors and the emitters of the switching elements Q3 to Q8.

An intermediate point of each phase arm is connected to the corresponding phase coil of the first motor generator 10. That is, ends on one side of three coils including a U-phase coil, a V-phase coil, and a W-phase coil of the first motor generator 10 are commonly connected to a neutral point. The other end of the U-phase coil is connected to the intermediate point between the switching elements Q3 and Q4. The other end of the V-phase coil is connected to the intermediate point between the switching elements Q5 and Q6. The other end of the W-phase coil is connected to the intermediate point between the switching elements Q7 and Q8.

The second inverter 222 includes phase arms 2U to 2W, switching elements Q9 to Q14, and diodes D9 to D14. The configuration of the second inverter 222 is basically the same as the configuration of the first inverter 221 and thus description thereof will not be repeated. The second motor generator 20 is also controlled by the second inverter 222 such that a torque corresponding to a torque command value is generated.

The first current sensor 241 in addition to the first resolver 421 is provided in the first motor generator 10. Similarly, the second current sensor 242 in addition to the second resolver 422 is provided in the second motor generator 20. The first current sensor 241 detects a three-phase current (a motor current MCRT1) flowing in the first motor generator 10. The second current sensor 242 detects a three-phase current (a motor current MCRT2) flowing in the second motor generator 20. These sensors output signals indicating the detection results to the ECU 300.

The ECU 300 controls the whole vehicle 1 such that traveling based on a driver's operation is realized. Specifically, the ECU 300 calculates a driving force (a driving torque) required for traveling of the vehicle based on the accelerator pedal depression amount Acc, the brake pedal depression amount Brk, and the vehicle speed SP. The ECU 300 determines an optimal output distribution of the engine 100, the first motor generator 10, and the second motor generator 20 for applying the driving torque to the output shaft 60, and generates operation commands for the first motor generator 10 and the second motor generator 20 and an operation command for the engine 100. The operation command for the engine 100 includes a stopping command and an operating command for the engine 100.

When the brake pedal is operated, the operation commands for the first motor generator 10, the second motor generator 20, the engine 100, and the brake device 55 are generated such that the distribution of the braking torque from the brake device 55 and the braking torque from a regeneration brake of the second motor generator 20 are controlled in cooperation to apply the braking torque corresponding to the brake pedal depression amount Brk to the output shaft 60. In general, when the brake pedal is operated, the stopping command is issued to the engine 100 and the operating command of a negative torque is issued to the second motor generator 20.

The operation command (at the time of operation) of the engine 100 includes a target engine rotation speed Ne* and a target engine torque Te*. The target engine rotation speed Ne* and the target engine torque Te* are set to a high-efficiency operation area of the engine 100 depending on a required power for the engine 100 which is set based on the output distribution. The ECU 300 controls actuators (not illustrated) that adjust fuel injection, ignition time, valve time, and the like such that the engine 100 is driven in accordance with the operation command (the target engine rotation speed Ne* and the target engine torque Te*).

The operation commands for the first motor generator 10 and the second motor generator 20 include a torque command value Tqcom1 for the first motor generator 10 and a torque command value Tqcom2 for the second motor generator 20. The ECU 300 controls the outputs of the first motor generator 10 and the second motor generator 20 through control of the converter 210, the first inverter 221, and the second inverter 222 in accordance with the operation commands.

The ECU 300 sets a target value (hereinafter referred to as a "target system voltage") VH* of the system voltage VH (a voltage across the capacitor C2) and controls ON and OFF of the switching elements Q1 and Q2 of the converter 210 such that the system voltage VH follows the target system voltage VH*. For example, a control signal PWMC for controlling ON and OFF of the switching elements Q1 and Q2 is generated by pulse width modulation (PWM) control. The target system voltage VH* is set to be variable depending on the operating states (such as rotation speeds and torques) of the first motor generator 10 and the second motor generator 20.

The ECU 300 controls the first inverter 221 and the second inverter 222 such that the first motor generator 10 and the second motor generator 20 operate in accordance with the operation commands (the torque command values Tqcom1 and Tqcom2) based on the outputs of the first resolver 421, the second resolver 422, the first current sensor 241, and the second current sensor 242 and the like.

Specifically, in order to control the output of the first motor generator 10, the ECU 300 generates a PWM control signal PWM1 for causing the switching elements Q3 to Q8 to perform a switching operation based on the system voltage VH, the rotation angle θ1 (an electrical angle), the motor current MCRT1, and the torque command value Tqcom1, and outputs the generated PWM control signal to the first inverter 221. On the other hand, when the first motor generator 10 stops, the ECU 300 generates a gate cutoff signal SDN1 for cutting off the gates of the switching elements Q3 to Q8 and shut down the first inverter 221.

Similarly, in order to control the output of the second motor generator 20, the ECU 300 generates a PWM control signal PWM2 for causing the switching elements Q9 to Q14 to perform a switching operation based on the system voltage VH, the rotation angle θ2 (an electrical angle), the motor current MCRT2, and the torque command value Tqcom2, and outputs the generated PWM control signal to the second inverter 222. On the other hand, when the second motor generator 20 stops, the ECU 300 can generate a gate cutoff signal SDN2 for cutting off the gates of the switching elements Q9 to Q14 and shut down the second inverter 222. In this way, the first inverter 221 and the second inverter 222 can be controlled in the same way by the ECU 300.

The ECU 300 calculates a state of charge (SCO), a discharge power upper limit value WOUT (WOUT≥0, where WOUT=0 indicates prohibition of discharging), and a charging power upper limit value WIN (WIN≤0, where WIN=0 indicates prohibition of charging) of the battery 150 based on the battery voltage VB, the battery current IB, and the battery temperature TB from the monitoring unit 440. In order to protect the battery 150, the torque command values Tqcom1 and Tqcom2 need to be set such that the sum of the input/output powers (torque×rotation speed) of the first motor generator 10 and the second motor generator 20 in order to protect the battery 150 is within a range from the charging power upper limit value WIN to the discharge power upper limit value WOUT.

Output control of the motor generators in traveling control will be described below. The ECU 300 causes the vehicle 1 to travel while switching between the EV traveling and the HV traveling depending on a traveling condition. For example, when the vehicle starts or travels at a low speed, the EV traveling is selected to prevent the engine 100 from operating in a low-efficiency area.

Figure 3:
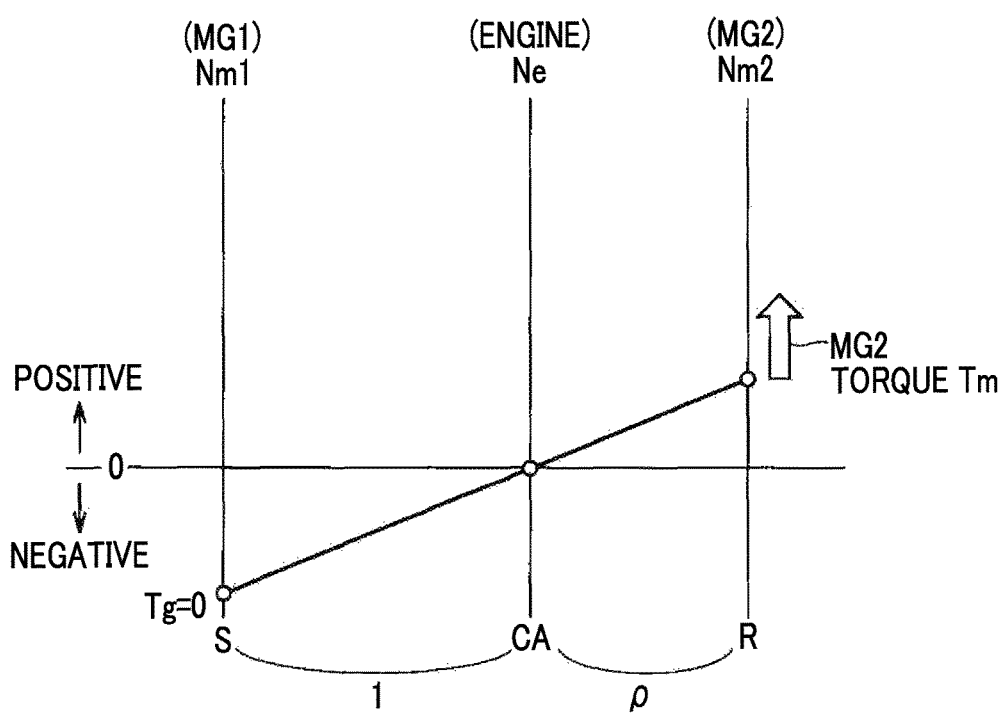
FIG. 3 is a nomogram of a planetary gear set illustrated in FIG. 1 when the hybrid vehicle is traveling in EV traveling.

FIG. 3 is a nomogram in the planetary gear set 30 in the EV traveling. Referring to FIG. 3, an MG1 rotation speed Nm1, an engine rotation speed Ne, and an MG2 rotation speed Nm2 which are the rotation speeds of the first motor generator 10, the engine 100, and the second motor generator 20 which are mechanically connected by the planetary gear set 30 have a relationship represented by Equation (1) using a gear ratio ρ. Accordingly, the MG1 rotation speed Nm1, the engine rotation speed Ne, and the MG2 rotation speed Nm2 are connected by a straight line in the nomogram.

$$\rho \times Nm1 = Ne \times (1+\rho) - Nm2 \times Gr \qquad (1)$$

Here, Gr denotes a gear shift ratio between the MG2 rotation speed Nm2 and the rotation speed of the output shaft 60. Hereinafter, in this embodiment in which the rotor 21 of the second motor generator 20 is connected to the output shaft 60 without passing through the transmission, Equation (1) is treated as Gr=1.

In the EV traveling, the engine 100 stops, and the driving force of the vehicle 1 is generated by the torque (an MG2 torque) Tm of the second motor generator 20 second motor generator 20. In the EV traveling, the torque (an MG1 torque) Tg of the first motor generator 10 is zero, and the first motor generator 10 rotates to follow the rotation of the second motor generator 20.

The rotation speed (MG1 rotation speed Nm1) of the first motor generator 10 is calculated by substituting Ne=0 into Equation (1). That is, Nm1=−(1/ρ)×Nm2 is established and the first motor generator 10 rotates in a negative direction as illustrated in FIG. 3 when the vehicle 1 travels forward (Nm2>0).

Figure 4:
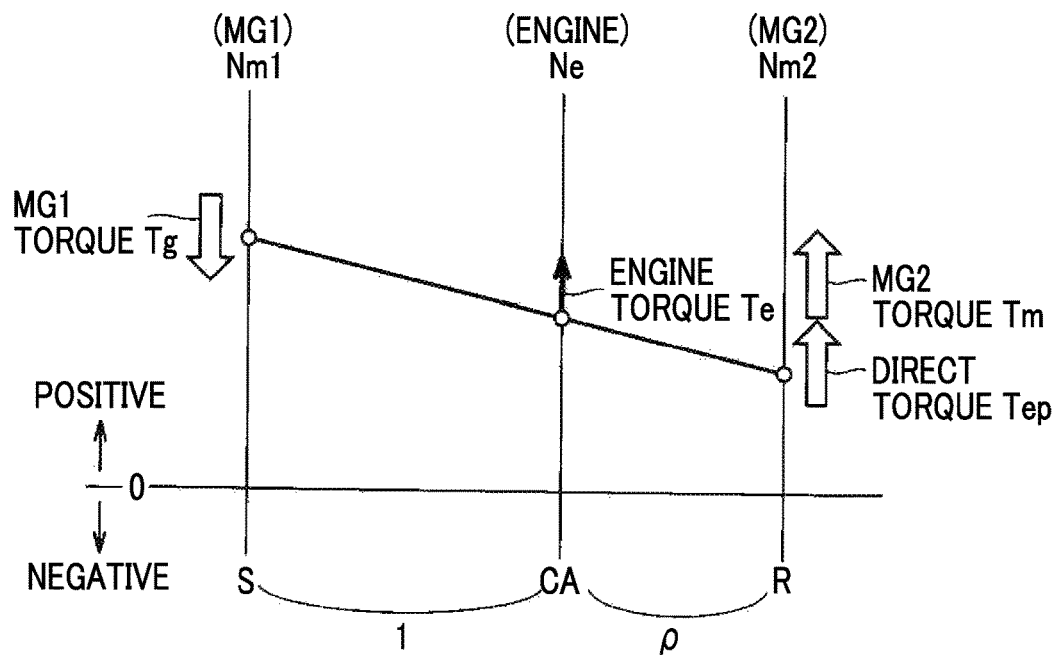
FIG. 4 is a nomogram of the planetary gear set when the hybrid vehicle is traveling in HV traveling.

On the other hand, the ECU 300 performs switching from the EV traveling to the HV traveling when an acceleration request is issued (an accelerator pedal is operated) by a driver or when it is necessary to cause the engine 100 to operate to charge the battery 150. FIG. 4 is a nomogram in the planetary gear set 30 in the HV traveling.

Referring to FIG. 4, in the HV traveling, the MG1 rotation speed Nm1, the engine rotation speed Ne, and the MG2 rotation speed Nm2 are connected to each other by a straight line in the nomogram based on the relationship represented by Equation (1). It can be understood from FIGS. 3 and 4 that, when two axes among three axes including the crank shaft 110 of the engine 100 and the rotor shafts of the first motor generator 10 and the second motor generator 20 which are connected to the planetary gear set 30 are determined, the rotation speed of the remaining one axis is determined.

In the HV traveling, the engine 100 operates, and the engine rotation speed Ne and the engine torque Te are controlled based on the target engine rotation speed Ne* and the target engine torque Te*.

The torque (MG1 torque) Tg and the rotation speed Nm1 of the first motor generator 10 are controlled such that the engine 100 operates in accordance with the target engine rotation speed Ne* and the target engine torque Te*. For example, a target MG1 rotation speed Nm1* can be determined from the target engine rotation speed Ne* and the current rotation speed (the MG2 rotation speed Nm2) of the output shaft 60 by Equation (2) to which Equation (1) is modified.

$$Nm1^* = (Ne^* \times (1+\rho) - Nm2)/\rho \quad (2)$$

The torque command value Tqcom1 can be set such that the MG1 torque Tg increases or decreases depending on a difference between the target MG1 rotation speed Nm1* and the MG1 rotation speed Nm1.

In normal forward traveling, as illustrated in FIG. 4, the MG1 torque Tg has a negative value (Tg<0) and the first motor generator 10 can generate electric power. Accordingly, when the MG1 torque Tg is controlled in accordance with the torque command value Tqcom1, a direct torque Tep (=−Tg/ρ) that acts in a vehicle forward traveling direction is delivered to the output shaft 60. The direct torque Tep corresponds to a torque which is delivered to the output shaft 60 when the engine 100 operates in accordance with the target engine rotation speed Ne* and the target engine torque Te* while receiving a reaction force from the first motor generator 10.

The MG2 torque Tm is additionally applied to the output shaft 60. That is, in the HV traveling, smooth traveling control is implemented by generating the MG2 torque Tm to compensate for the direct torque Tep in excess or shortage with respect to the driving torque required for the vehicle 1.

In this way, in the vehicle 1, the output torques (Tg and Tm) of the first motor generator 10 and the second motor generator 20 need to be controlled to follow the torque command values Tqcom1 and Tqcom2 which are set by the traveling control.

Normal output control of the motor generators will be described below. In this embodiment, pulse width modulation (PWM) control will be described as the output control of the motor generators.

Figure 5:
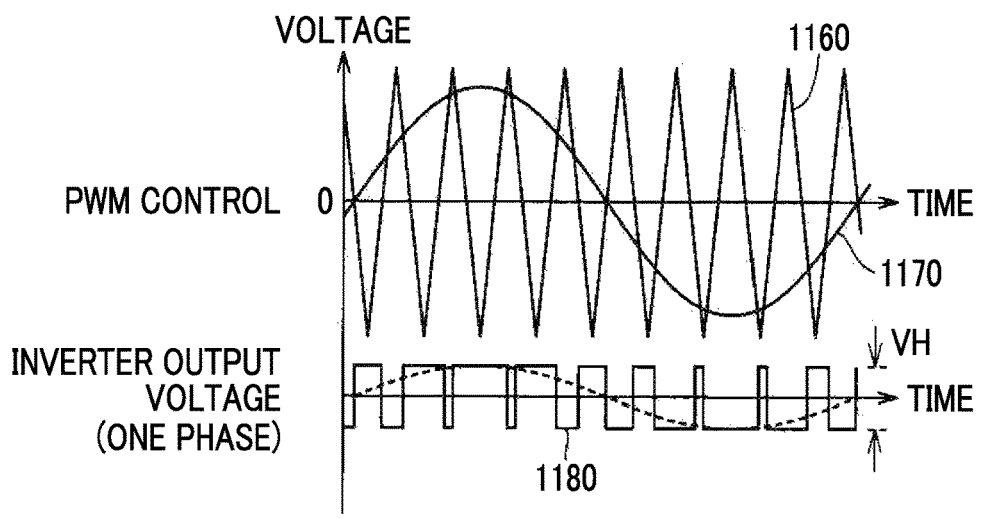
FIG. 5 is a conceptual waveform diagram illustrating a basic operation of pulse width modulation (PWM) control in the electrical system.

FIG. 5 is a conceptual waveform diagram illustrating a basic operation of the PWM control. Referring to FIG. 5, in the PWM control, ON and OFF of the switching elements in the phases of the first inverter 221 and the second inverter 222 are controlled based on a voltage comparison result of a carrier wave 1160 and a phase voltage command 1170. Accordingly, a pulse-width-modulated voltage 1180 as a pseudo-sinusoidal voltage is applied to each phase of the first motor generator 10 and the second motor generator 20. The carrier wave 1160 can be constituted by a triangular wave or a sawteeth wave of a predetermined frequency. The phase voltage command 1170 is a phase voltage which is used for the first motor generator 10 and the second motor generator 20 to output torques corresponding to the torque command values Tqcom1 and Tqcom2, and is calculated as follows. A pulse height of the pulse-width-modulated voltage 1180 corresponds to the system voltage VH.

Figure 6:
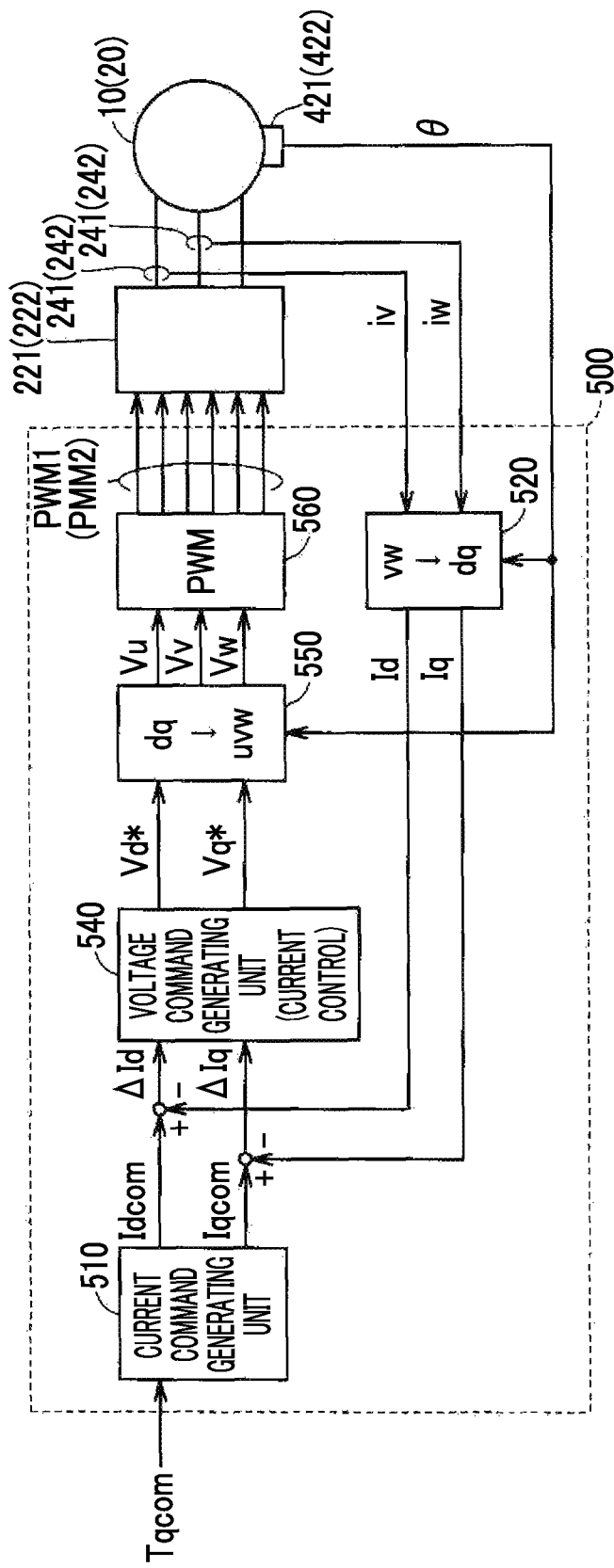
FIG. 6 is a functional block diagram illustrating a configuration of output control for each motor generator.

FIG. 6 is a functional block diagram illustrating a configuration of the output control for the first motor generator 10 and the second motor generator 20. The control configuration of the PWM control illustrated in FIG. 6 is common to the first motor generator 10 and the second motor generator 20. In the following description, the torque command values Tqcom1 and Tqcom2 for the first motor generator 10 and the second motor generator 20 are collectively referred to as a torque command value Tqcom. The rotation angles θ1 and θ2 of the first motor generator 10 and the second motor generator 20 are collectively referred to as an electrical angle θ.

Referring to FIG. 6, a PWM control unit 500 includes a current command generating unit 510, coordinate transformation units 520 and 550, a voltage command generating unit 540, and a PWM modulation unit 560. The functional blocks in the functional block diagrams illustrated in FIG. 6 and FIG. 7 which will be described later may be embodied by electronic circuits (hardware) having functions corresponding to the blocks in the ECU 300, or may be embodied by causing the ECU 300 to perform a software process in accordance with a program stored in advance.

The PWM control unit 500 periodically performs a control operation. In the following description, an elapsed time from a previous control cycle of the PWM control to a current control cycle is defined as Δt. That is, Δt corresponds to a control cycle of the PWM control. The control cycle Δt may be a constant value or may be variable depending on changes of the MG1 rotation speed Nm1 and the MG2 rotation speed Nm2 or the like.

The current command generating unit 510 generates a d-axis current command value Idcom and a q-axis current command value Iqcom depending on the torque command value Tqcom based on a previously prepared table or the like. Current amplitude is determined by √(Idcom2+Iqcom2), and a current phase is determined by a ratio of Idcom and Iqcom.

The coordinate transformation unit 520 calculates a d-axis current Id and a q-axis current Iq by coordinate transformation (d-q transformation) using the electrical angle θ. Specifically, the coordinate transformation unit 520 transforms three-phase currents iu, iv, and iw, which are detected by the first current sensor 241 (the second current sensor 242) to the d-axis current Id and the q-axis current Iq by Equation (3).

$$\begin{bmatrix} Id \\ Iq \end{bmatrix} = \sqrt{\frac{2}{3}} \begin{bmatrix} \cos\theta & \cos\left(\theta + \frac{2}{3}\pi\right) & \cos\left(\theta - \frac{2}{3}\pi\right) \\ \sin\theta & \sin\left(\theta + \frac{2}{3}\pi\right) & \sin\left(\theta - \frac{2}{3}\pi\right) \end{bmatrix} \begin{bmatrix} iu \\ iv \\ iw \end{bmatrix} \quad (3)$$

Since the sum of the instantaneous values of the three-phase currents iu, iv, and iw is zero (iu+iv+iw=0), a current of one phase can be calculated by arranging the first current sensor 241 (the second current sensor 242) in two phases.

A difference ΔId (ΔId=Idcom−Id) of the d-axis current from a command value and a difference ΔIq (ΔIq=Iqcom−Iq) of the q-axis current from a command value are input to the voltage command generating unit 540. The voltage command generating unit 540 calculates a current control difference by performing a PI (proportional integral) operation with a predetermined gain on the d-axis current difference ΔId and the q-axis current difference ΔIq, and generates a d-axis voltage command value Vd* and a q-axis voltage command value Vq* based on the current control difference.

A voltage equation on the d-q plane is known to be given by Equation (4). The voltage command generating unit 540 calculates the voltage command values Vd* and Vq* based on the relationship of Id, Iq, Vd, and Vq in the voltage equation.

$$\begin{bmatrix} Vd \\ Vq \end{bmatrix} = \begin{bmatrix} Ra + Ld\frac{d}{dt} & -\omega \cdot Lq \\ \omega \cdot Ld & Ra + Lq\frac{d}{dt} \end{bmatrix} \begin{bmatrix} Id \\ Iq \end{bmatrix} + \begin{bmatrix} 0 \\ \omega \cdot \varphi \end{bmatrix} \quad (4)$$

In Equation (4), Vd denotes a d-axis voltage, Vq denotes a q-axis voltage, and Ra, Ld, and Lq denote circuit constant parameters of the first motor generator 10 (the second motor generator 20). Specifically, Ra denotes a resistance value of one phase, Ld denotes a d-axis inductance, Lq denotes a q-axis inductance, and φ denotes a magnetic flux from the permanent magnet of the rotor 11 (21). In addition, ω denotes a rotational angular velocity of the first motor generator 10 (the second motor generator 20).

The coordinate transformation unit 550 calculate voltage commands Vu, Vv, and Vw of the U phase, the V phase, and the W phase by coordinate transformation (d-q inverse transformation) using the electrical angle θ. Specifically, the coordinate transformation unit 550 transforms the d-axis voltage command value Vd* and the q-axis voltage command value Vq* from the voltage command generating unit 540 into the voltage commands Vu, Vv, and Vw by Equation (5).

$$\begin{bmatrix} Vu \\ Vv \\ Vw \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} Vd^* \\ Vq^* \end{bmatrix} \quad (5)$$

The PWM modulation unit 560 generates a control signal PWM1 (PWM2) for controlling ON and OFF of the first inverter 221 (the second inverter 222) based on the voltage comparison result of the carrier wave 1160 (FIG. 5) and the phase voltage commands Vu, Vv, and Vw from the coordinate transformation unit 550. The phase voltage commands Vu, Vv, and Vw correspond to the phase voltage command 1170 in FIG. 5.

Accordingly, ON and Off of the switching elements Q3 to Q8 (Q9 to Q14) of the upper and lower arms of the first inverter 221 (the second inverter 222) are controlled in accordance with the control signal PWM1 (PWM2). Accordingly, pseudo-sinusoidal voltages (the pulse-width-modulated voltage 1180 in FIG. 5) corresponding to the voltage commands Vu, Vv, and Vw are applied to the phases of the first motor generator 10 (the second motor generator 20).

The amplitude of the carrier wave 1160 in the PWM modulation corresponds to the system voltage VH. When the amplitude of the phase voltage commands Vu, Vv, and Vw is normalized by dividing the original amplitude values based on Vd* and Vq* by the system voltage VH, the amplitude of the carrier wave 1160 which is used for the PWM modulation unit 560 can be fixed.

The output control of the motor generators when a resolver is abnormal will be described below. As described above, an electrical angle θ is required for the output control of the first motor generator 10 and the second motor generator 20 including a permanent magnet in the rotor thereof.

In the control in the normal state (the state in which the resolver is normal) illustrated in FIG. 6, the electrical angle θ required for coordinate transformation of Equations (3) and (5) which is performed by the coordinate transformation units 520 and 550 is calculated from the detected value of the first resolver 421 (the second resolver 422).

Accordingly, in the control configuration illustrated in FIG. 6, when an abnormality has occurred in one of the first resolver 421 and the second resolver 422, the electrical angle θ in the motor generator including a resolver having an abnormality occurring therein cannot be detected and thus the output control thereof cannot be performed. In this embodiment, control in a case in which an abnormality has occurred in the second resolver 422 of the second motor generator 20 and the first resolver 421 of the first motor generator 10 can normally detect the electrical angle θ will be described below.

When an abnormality has occurred in the resolver, JP 2007-244126 A discloses that the inverter corresponding to the second motor generator 20 (MG2) in which an abnormality has occurred in the resolver thereof is shut down to stop output of a torque from the motor generator and limp form traveling using the output of the engine 100 and the first motor generator (MG1) in which an abnormality does not occur in the resolver thereof is performed.

The limp form traveling described in JP 2007-244126 A means that the vehicle 1 travels using only the direct torque Tep with Tm=0 in the nomogram illustrated in FIG. 4. However, during traveling of the vehicle, since the first motor generator 10 (MG1) continues to output a negative torque and thus the first motor generator 10 continues to generate electric power. As a result, when the SOC of the battery 150 increases to the upper limit, the output of a torque from the first motor generator 10 (MG1) has to be stopped and traveling of the vehicle is disabled. That is, in the limp form traveling described in JP 2007-244126 A, there is concern that a traveling distance cannot be secured.

Figure 7:
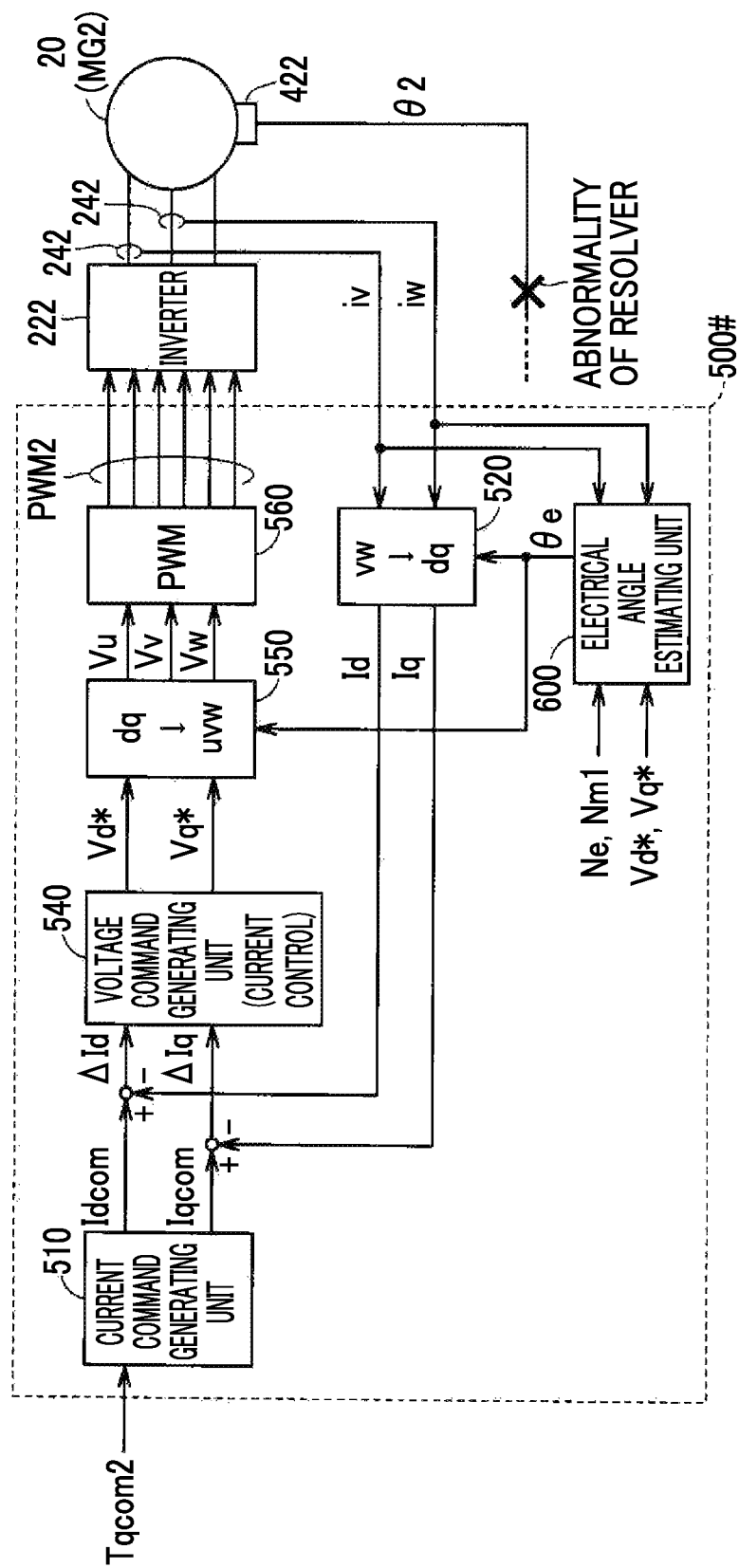
FIG. 7 is a functional block diagram illustrating a configuration of output control (resolverless control) for a motor generator of which a resolver has an abnormality occurring therein in the vehicle according to the embodiment.

FIG. 7 is a functional block diagram illustrating a configuration of the output control for the motor generator of which the resolver has an abnormality occurring therein in the vehicle according to this embodiment.

In this embodiment, the output of the first motor generator 10 in which the first resolver 421 can normally detect the electrical angle θ1 is controlled by the control configuration illustrated in FIG. 6. On the other hand, the output control illustrated in FIG. 7 is applied to the second motor generator 20 in which an abnormality has occurred in the resolver thereof. In the following description, the output control of the motor generator based on the control configuration illustrated in FIG. 7 is also referred to as "resolverless control."

Referring to FIG. 7, a PWM control unit 500# for resolverless control additionally include an electrical angle estimating unit 600 for estimating an electrical angle of the motor generator (here, the second motor generator 20) in which an abnormality has occurred in the resolver thereof in addition to the PWM control unit 500 illustrated in FIG. 6. The PWM control unit 500# performs an operation periodically (with a control cycle Δt) similarly to the PWM control unit 500 illustrated in FIG. 6. In the following description, the control cycle in the PWM control unit 500# illustrated in FIG. 7 is also referred to as Δt.

The electrical angle estimating unit 600 calculates an estimated electrical angle value θe of the second motor generator 20 using the engine rotation speed Ne, the MG1 rotation speed Nm1, the voltage command values Vd* and Vq*, and the detected current value (the three-phase current) of the second current sensor 242.

The coordinate transformation unit 520 calculates the d-axis current Id and the q-axis current Iq from the three-phase currents iu, iw, and iv detected by the second current sensor 242 by the coordinate transformation (Equation (3)) using the estimated electrical angle value θe from the electrical angle estimating unit 600 instead of using the electrical angle θ2 detected by the second resolver 422.

Similarly, the coordinate transformation unit 550 calculates the voltage commands Vu, Vv, and Vw from the voltage command values Vd* and Vq* from the voltage command generating unit 540 by the coordinate transformation (Equation (5)) using the estimated electrical angle value θe from the electrical angle estimating unit 600.

The other configuration and the other function of the PWM control unit 500# illustrated in FIG. 7 are the same as those of the PWM control unit 500 illustrated in FIG. 6 and thus detailed description thereof will not be repeated. That is, in the motor generator in which an abnormality has occurred in the resolver thereof, d-q transformation (the coordinate transformation unit 520) and d-q inverse transformation (the coordinate transformation unit 550) are performed using the estimated electrical angle value θe calculated by the electrical angle estimating unit 600 without using the detected value of the resolver.

Figure 8:
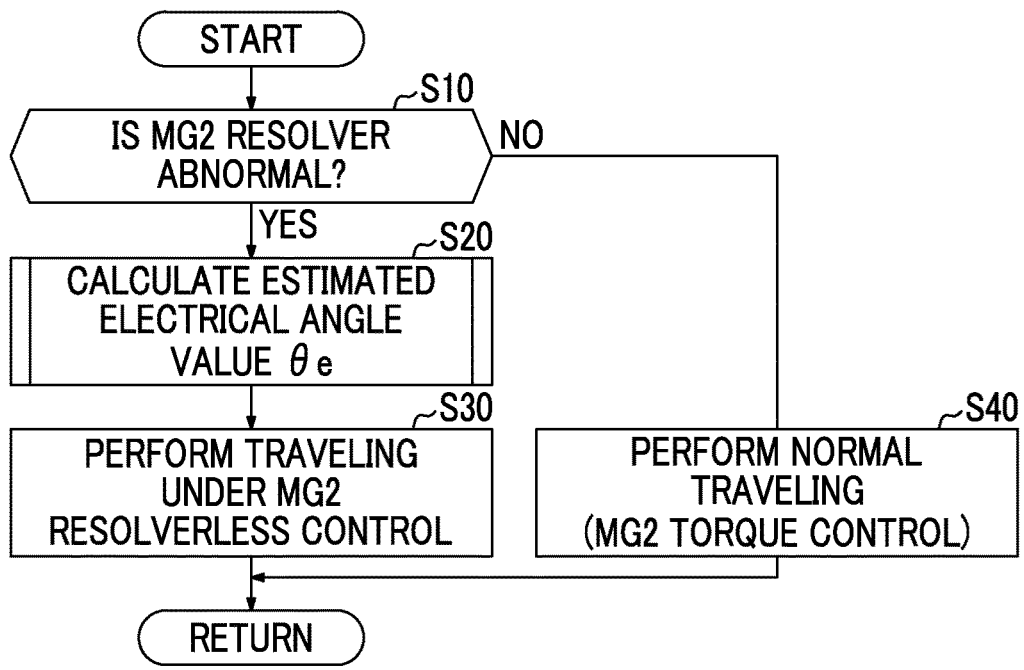
FIG. 8 is a flowchart illustrating a traveling control routine of the vehicle when the resolver is abnormal.

FIG. 8 is a flowchart illustrating a traveling control routine of the vehicle when an abnormality has occurred in a resolver thereof. As described above, a case in which an abnormality has occurred in the second resolver 422 of the second motor generator 20 and the first resolver 421 of the first motor generator 10 can normally detect the electrical angle θ1 will be described below. The control routine in the flowchart illustrated in FIG. 8 is repeatedly performed by the ECU 300 in the ready-ON state.

Referring to FIG. 8, the ECU 300 determines whether an abnormality of the resolver of the second motor generator 20 (MG2 resolver abnormality) has occurred (Step S10). This determination can be performed, for example, based on the output of a diagnosis code or the like.

When the MG2 resolver abnormality has not occurred (NO in Step S10), the ECU 300 performs normal traveling (Step S40). In the normal traveling, the output of the second motor generator 20 is controlled using the electrical angle θ2 based on the detected value of the second resolver 422 in accordance with the control configuration illustrated in FIG. 6.

When it is determined in Step S10 that the MG2 resolver abnormality has occurred (YES in Step S10), the ECU 300 performs a calculation operation of calculating the estimated electrical angle value θe of the second motor generator 20 using the engine rotation speed Ne, the MG1 rotation speed Nm1, the voltage command values Vd* and Vq*, and the detected current value (the three-phase currents) of the second current sensor 242 without using the detected value of the second resolver 422 (Step S20). The process of calculating the estimated electrical angle value θe will be described later in detail.

When the estimated electrical angle value θe of the second motor generator 20 is calculated, the ECU 300 performs traveling under MG2 resolverless control (Step S30). That is, in the MG2 resolverless control, the output of the second motor generator 20 is controlled using the estimated electrical angle value θe calculated by the electrical angle estimating unit 600 in accordance with the control configuration illustrated in FIG. 7.

Figure 9:
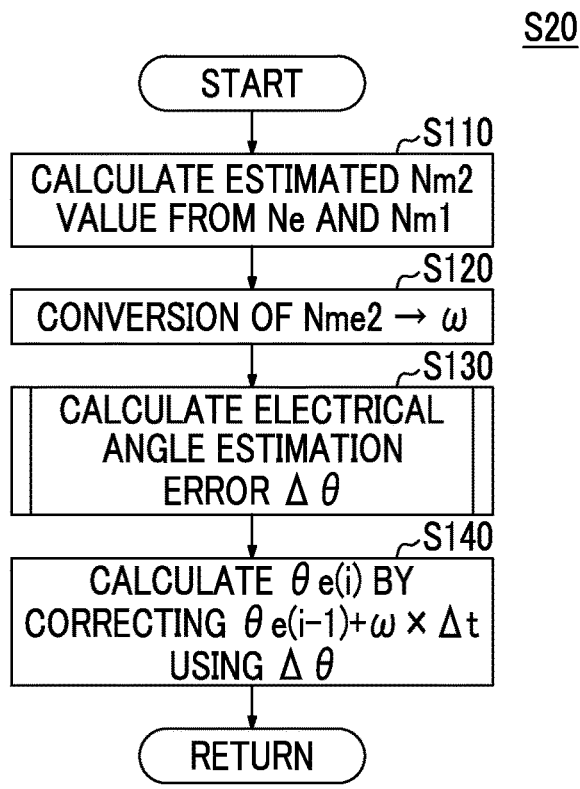
FIG. 9 is a flowchart illustrating an estimated electrical angle value calculating process which is performed in Step S20 in FIG. 8.

FIG. 9 is a flowchart illustrating the process of calculating the estimated electrical angle value θe which is performed in Step S20 in FIG. 8. Referring to FIG. 9, the ECU 300 calculates an estimated value of the MG2 rotation speed Nm2 (estimated MG2 rotation speed value Nme2) using the engine rotation speed Ne and the MG1 rotation speed Nm1 calculated from the detected values of the rotation detection sensor 410 and the first resolver 421 (Step S110).

Specifically, a calculation expression for the estimated MG2 rotation speed value Nme2 in Step S110 can employ Equation (6) which is acquired by modifying Equation 91) with Gr=1 using the nomogram illustrated in FIG. 4 and Equation (1).

$$Nme2 = Ne \times (1+\rho) - Nm1 \times \rho \qquad (6)$$

Subsequently, ECU 300 converts the estimated MG2 rotation speed value Nme2 calculated in Step S110 into a rotational angular velocity ω (Step S120). An electrical angle change (ω×Δt) between control cycles can be calculated by a product of the rotational angular velocity ω and the control cycle Δt of the PWM control.

The ECU 300 can calculate the estimated electrical angle value θe in each control cycle by sequentially integrating the electrical angle change (ω×Δt) between the control cycles based on the estimated MG2 rotation speed value Nme2. For example, in an i-th control cycle (where i is a natural number), the estimated electrical angle value θe(i) in the current control cycle can be calculated by a sum of the estimated electrical angle value θe(i−1) in a previous control cycle and an electrical angle change ω×Δt between the (i−1)-th cycle and the i-th cycle.

On the other hand, when an error is included in the initial value of the estimated electrical angle value θe at the time of starting of the resolverless control, an error has occurred in the output torque of the motor generator by only integrating the electrical angle change ω×Δt between the control cycles. Accordingly, in the resolverless control according to this embodiment, a process of calculating an estimation error Δθ of an electrical angle in each control cycle is performed to enhance accuracy of the estimated electrical angle value θe.

Specifically, the ECU 300 calculates the estimation error Δθ of the estimated electrical angle value θe(i−1) in the previous control cycle using the control command for the second inverter 222 under the PWM control and an actual current value based on the detected value of the current sensor 242 (Step S130).

Figure 10:
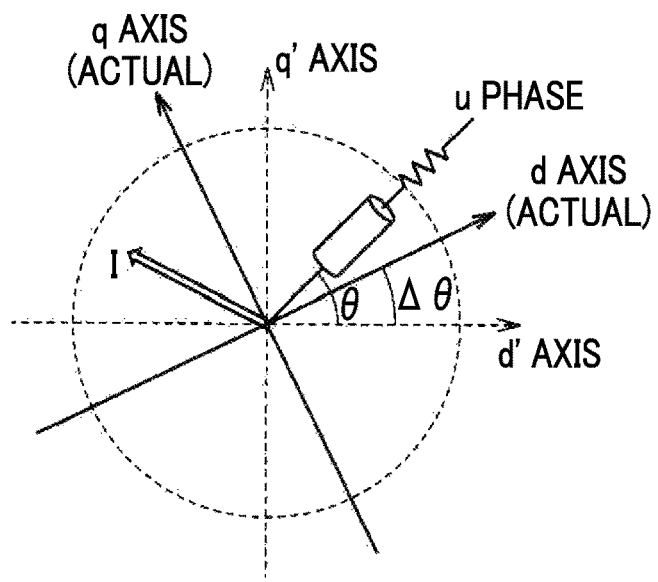
FIG. 10 is a conceptual diagram illustrating a principle for calculating an electrical angle estimation error.

FIG. 10 is a conceptual diagram illustrating a principle for calculating an electrical angle estimation error Δθ which is the estimation error Δθ of the estimated electrical angle value θe(i−1). Referring to FIG. 10, a current vector in the d-q plane corresponds to vectors of the d-axis current Id and the q-axis current Iq to which the three-phase currents iu, iv, and iw are converted by Equation (3). The electrical angle θ at this time is defined by an angle formed by the d axis corresponding to the N pole of the permanent magnet and a U-phase AC winding.

A d' axis and a q' axis in FIG. 10 are the d axis and the q axis which serve as a reference for the current estimated electrical angle value θe. The d' axis and a q' axis has an error of Δθ from the actual d axis and the actual q axis. In Step S130 in FIG. 9, estimated calculation of the electrical angle estimation error Δθ is performed.

Referring back to FIG. 7, conversion of the voltage command values Vd* and Vq* into the three-phase voltage commands Vu, Vv, and Vw based on current feedback is performed using the estimated electrical angle value θe including the electrical angle estimation error Δθ. A current which is generated by applying the voltage commands Vu, Vv, and V2 based on the voltage command values Vd* and Vq*, that is, a current which is actually generated in accordance with the control command for the second inverter 222, has a value corresponding to an actual electrical angle (θe−Δθ). That is, the d-axis current and the q-axis current acquired by converting the actual three-phase currents include the electrical angle estimation error Δθ.

Accordingly, a relationship expressed by Equation (7) corresponding to linear transformation based on rotation of an angle Δθ is established between the d-axis current Id and the q-axis current Iq which should be generated due to the voltage command values Vd* and Vq* based on a voltage equation (Equation (7)).

$$\begin{bmatrix} Id \\ Iq \end{bmatrix} = \begin{bmatrix} \cos\Delta\theta & -\sin\Delta\theta \\ \sin\Delta\theta & \cos\Delta\theta \end{bmatrix} \begin{bmatrix} Id\_s \\ Iq\_s \end{bmatrix} \quad (7)$$

Similarly, a relationship expressed by Equation (8) is established between theoretical values Vd_t and Vq_t corresponding to the voltage command values Vd* and Vq* and the d-axis voltage Vd and the q-axis voltage Vq actually applied to the second motor generator 20.

$$\begin{bmatrix} Vd \\ Vq \end{bmatrix} = \begin{bmatrix} \cos\Delta\theta & -\sin\Delta\theta \\ \sin\Delta\theta & \cos\Delta\theta \end{bmatrix} \begin{bmatrix} Vd\_t \\ Vq\_t \end{bmatrix} \quad (8)$$

The electrical angle estimating unit 600 calculates the d-axis current Id_s and the q-axis current Iq_s based on the sensor detected value from the three-phase currents (iu, iv, and iw) in the current control cycle which is detected by the current sensor 242 by coordinate transformation (Equation (3)) using the estimated electrical angle value θe(i−1) in the previous control cycle.

The electrical angle estimating unit 600 sets the voltage command values Vd* and Vq* in the previous control cycle, that is, in the (i−1)-th cycle, as the theoretical values Vd_t and Vq_t of the voltage command values. The electrical angle estimating unit 600 calculates coefficient parameters ka to kd for calculating the electrical angle estimation error Δθ from Id_s and Iq_s based on the sensor detected values and the theoretical values Vd_t and Vq_t of the voltage command values.

The coefficient parameters ka to kd will be described below. On the left side of the voltage equation (Equation (4)), Vd=cos Δθ×Vd_t−sin Δθ×Vq_t and Vq=sin Δθ×Vd_t+cos Δθ×Vq_t which are acquired from Equation (8) can be substituted into the d-axis voltage Vd and the q-axis voltage Vq.

Similarly, in the right side of the voltage equation (Equation (4)), Id=cos Δθ×Id_s−sin Δθ×Iq_s and VIq=sin Δθ×Id_s+cos Δθ×Iq_s which are acquired from Equation (7) can be substituted into the d-axis current Id and the q-axis current Iq.

By these substitutions, the voltage equation can be modified to Equation (9) with cos Δθ and sin Δθ as parameters.

$$\begin{bmatrix} ka & kb \\ kd & kc \end{bmatrix} \begin{bmatrix} \cos\Delta\theta \\ \sin\Delta\theta \end{bmatrix} = \begin{bmatrix} 0 \\ \omega \cdot \varphi \end{bmatrix} \quad (9)$$

In Equation (9), ka to kd which serve as coefficients of cos Δθ and sin Δθ are expressed by Equations (10) to (13) using Id_s and Iq_s based on the sensor detected values and the theoretical values Vd_t and Vq_t of the voltage command values as parameters.

$$ka = Vd\_t - Ra \cdot Id\_s - Ld\frac{d}{dt}Id\_s + \omega \cdot Lq \cdot Iq\_s \quad (10)$$

$$kb = -Vq\_t + Ra \cdot Iq\_s + Ld \cdot \frac{d}{dt}Iq\_s + \omega \cdot Lq \cdot Id\_s \quad (11)$$

$$kc = Vd\_t - Ra \cdot Id\_s - Lq\frac{d}{dt}Id\_s + \omega \cdot Ld \cdot Iq\_s \quad (12)$$

$$kd = Vq\_t - Ra \cdot Iq\_s - Lq\frac{d}{dt}Iq\_s - \omega \cdot Ld \cdot Id\_s \quad (13)$$

In Equation (9), when Δθ=0 is satisfied, that is, when Id=Id_s, Iq=Iq_s, Vd=Vd_t, and Vq=Vq_t are satisfied, it can be understood from comparison with the voltage equation (Equation (4)) that ka and kd which serve as coefficients of cos Δθ are ka=0 and kd=ω×φ. When Δθ=0 is satisfied, sin Δθ=0 is satisfied and thus kb×sin Δθ=kc×sin Δθ=0 is established.

The electrical angle estimating unit 600 calculates the coefficient parameters ka to kd by substituting Id_s and Iq_s based on the sensor detected values and the theoretical values Vd_t and Vq_t of the voltage command values into Equations (10) to (13). The circuit constant parameters Ra, Ld, and Lq in the voltage equation are acquired in advance and the rotational angular velocity ω is calculated in Step S120 in FIG. 9.

The electrical angle estimating unit 600 calculates sin Δθ and cos Δθ by substituting the coefficient parameters ka to kd into Equation (14) to which the simultaneous equations of Equation (9) are modified, and calculates the electrical angle estimation error Δθ from the calculated sin Δθ and cos Δθ.

$$\begin{bmatrix} \cos\Delta\theta \\ \sin\Delta\theta \end{bmatrix} = \frac{1}{kakc - kbkd} \begin{bmatrix} kc & -kb \\ -kd & ka \end{bmatrix} \begin{bmatrix} 0 \\ \omega \cdot \varphi \end{bmatrix} \quad (14)$$

Referring back to FIG. 9, the ECU 300 calculates the estimated electrical angle value θe(i) in the current control cycle (that is, the i-th cycle) (Step S140). Specifically, the estimated electrical angle value θe(i) is calculated by adding the electrical angle change (ω×Δt) between the control cycles based on the rotational angular velocity ω calculated in Step S120 to the estimated electrical angle value θe(i−1) in the previous control cycle and correcting the resultant using the electrical angle estimation error Δθ calculated in Step S130 (θe(i)=θe(i−1)+ω×Δt−Δθ).

The correction using the electrical angle estimation error Δθ can also be reflected in the estimated electrical angle value θe as a learning value smoothed by a low-pass filter or the like in addition to direct reflection in the estimated electrical angle value θe for each control cycle as described above. At any rate, Δθ converges on zero with a decrease in the error between the estimated electrical angle value θe and the actual electrical angle.

In this way, the estimated electrical angle value θe is corrected using the electrical angle estimation error Δθ, and the estimated electrical angle value θe converges a true electrical angle θ (θ2) with convergence of the electrical angle estimation error Δθ on zero. Here, when the second inverter 222 that drives the second motor generator 20 is controlled based on the estimated electrical angle value θe having a large estimation error while the absolute value of the electrical angle estimation error Δθ is kept large, that is, until the estimated electrical angle value θe converges, a phase difference between the output voltage of the second inverter 222 and the counter-electromotive force (voltage) generated in the second motor generator 20 is great and thus there is a likelihood that an overcurrent will flow in the second inverter 222.

Figure 11:
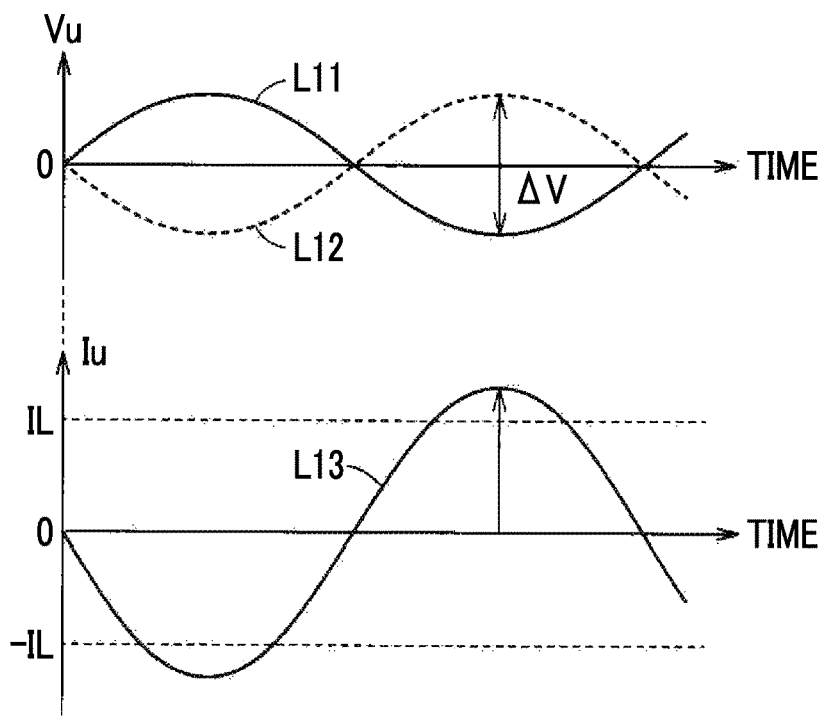
FIG. 11 is a diagram illustrating a state in which an overcurrent flows in an inverter when the electrical angle estimation error is large as a comparative example of the embodiment of the present disclosure.

FIG. 11 is a diagram illustrating a state in which an overcurrent flows in the second inverter 222 when the electrical angle estimation error Δθ is kept large as a comparative example of this embodiment. In FIG. 11, the U phase among the U phase, the V phase, and the W phase is representatively illustrated, and the V phase and the W phase exhibit the same behavior as the U phase.

Referring to FIG. 11, a line L11 denotes a counter-electromotive force (voltage) generated in the U-phase coil of the second motor generator 20, and a dotted line L12 denotes the U-phase output voltage Vu of the second inverter 222. A line L13 denotes the U-phase current Iu of the second inverter 222, and values IL and –IL denote an upper limit value and a lower limit value of the U-phase current Iu.

In the example illustrated in FIG. 11, a case in which the electrical angle estimation error Δθ is great (about 180 degrees) is illustrated. When the switching of the second inverter 222 is performed in a state in which the electrical angle estimation error Δθ is great, a voltage difference (ΔV) between the counter-electromotive force (voltage) generated in the U-phase coil and the U-phase output voltage Vu of the second inverter 222 increases as illustrated in the drawing and thus such an overcurrent that the U-phase current Iu is larger than the upper and lower limit values IL and –IL may flow in the second inverter 222.

Therefore, in the vehicle 1 according to this embodiment, the ECU 300 generates a control command for the second inverter 222 such that the output voltage of the second inverter 222 is a constant potential to prevent an overcurrent from flowing in the second inverter 222 while the electrical angle estimation error Δθ is large (until the electrical angle estimation error Δθ converges to be equal to or less than a predetermined value) after starting of the resolverless control in the traveling of the vehicle under the resolverless control.

Figure 12:
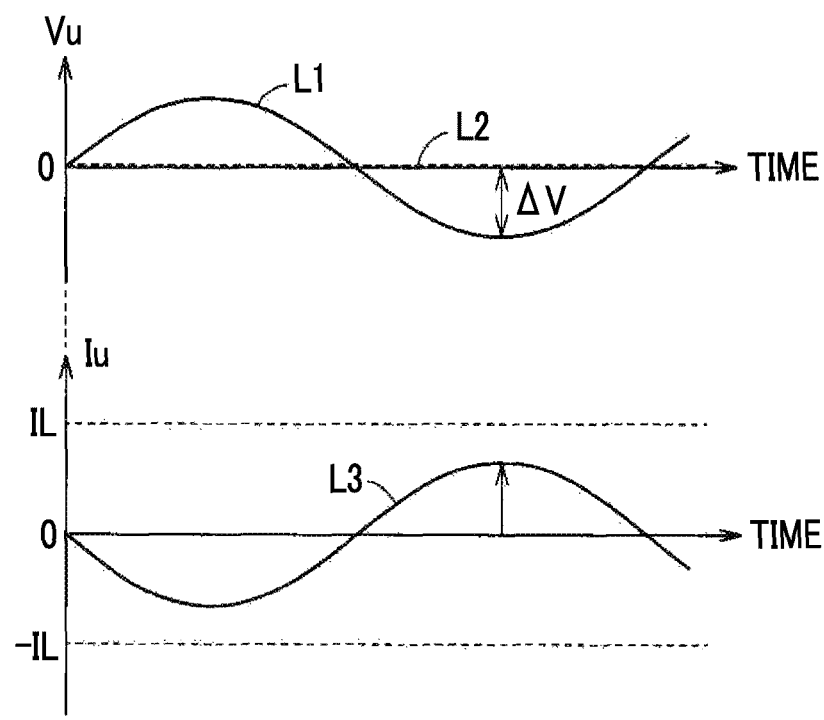
FIG. 12 is a diagram illustrating a state in which an overcurrent in the inverter is curbed.

FIG. 12 is a diagram illustrating a state in which an overcurrent flowing in the second inverter 222 is curbed. In FIG. 12, the U phase among the U phase, the V phase, and the W phase is representatively illustrated, but the V phase and the W phase exhibit the same behavior as the U phase.

Referring to FIG. 12, a line L1 denotes a counter-electromotive force (voltage) generated in the U-phase coil of the second motor generator 20, and a dotted line L2 denotes the U-phase output voltage Vu of the second inverter 222. A line L3 denotes the U-phase current Iu of the second inverter 222, and values IL and –IL denote an upper limit value and a lower limit value of the U-phase current Iu.

While the electrical angle estimation error Δθ is large (until the electrical angle estimation error Δθ converges to be equal to or less than a predetermined value) after starting of the resolverless control, the ECU 300 generates a control command for the second inverter 222 such that the U-phase output voltage Vu of the second inverter 222 is a constant potential. In this example, the ECU 300 generates the control command for the second inverter 222 such that the U-phase output voltage Vu of the second inverter 222 becomes zero. Accordingly, since only a current corresponding to the counter-electromotive force of the second motor generator 20 flows in the second inverter 222, it is possible to prevent an overcurrent exceeding the upper and lower limit values IL and –IL from flowing in the second inverter 222.

Figure 13:
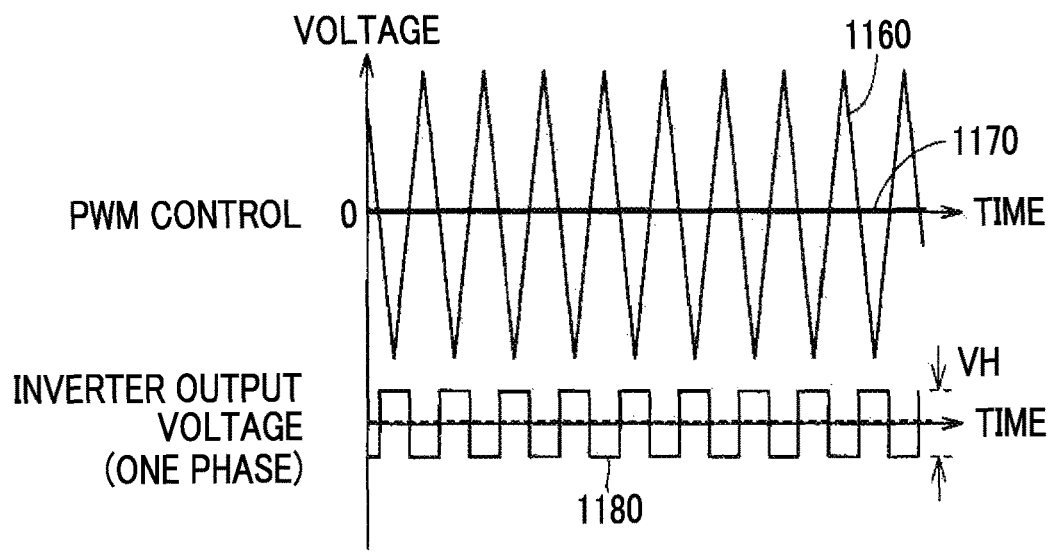
FIG. 13 is a waveform diagram of PWM control when the electrical angle estimation error which is an estimation error of the estimated electrical angle value is large.

FIG. 13 is a waveform diagram of PWM control when the electrical angle estimation error Δθ is kept large. Referring to FIG. 13 along with FIG. 5 in which the basic operation of the PWM control is illustrated, the phase voltage command 1170 has a constant potential (zero in this example) when the electrical angle estimation error Δθ is kept large. Accordingly, in this example in which the phase voltage command 1170 has a constant potential of zero, a pulse voltage with an ON/OFF duty ratio of 50% for each phase is output from the second motor generator 20.

In this way, when the electrical angle estimation error Δθ is kept large (until the electrical angle estimation error Δθ converges to be equal or less than a predetermined value) after starting of the resolverless control, the control command for the second inverter 222 is generated such that the output voltage of the second inverter 222 has a constant potential for each phase. Estimation of the electrical angle θ2 is performed under the control operation based on such a control command.

Although not particularly illustrated, after the electrical angle estimation error Δθ converges to be equal to or less than the predetermined value, the control command for the second inverter 222 is generated based on the torque command value Tqcom2 for the second motor generator 20, and estimation of the electrical angle θ2 is performed under the control operation based on such a control command.

Figure 14:
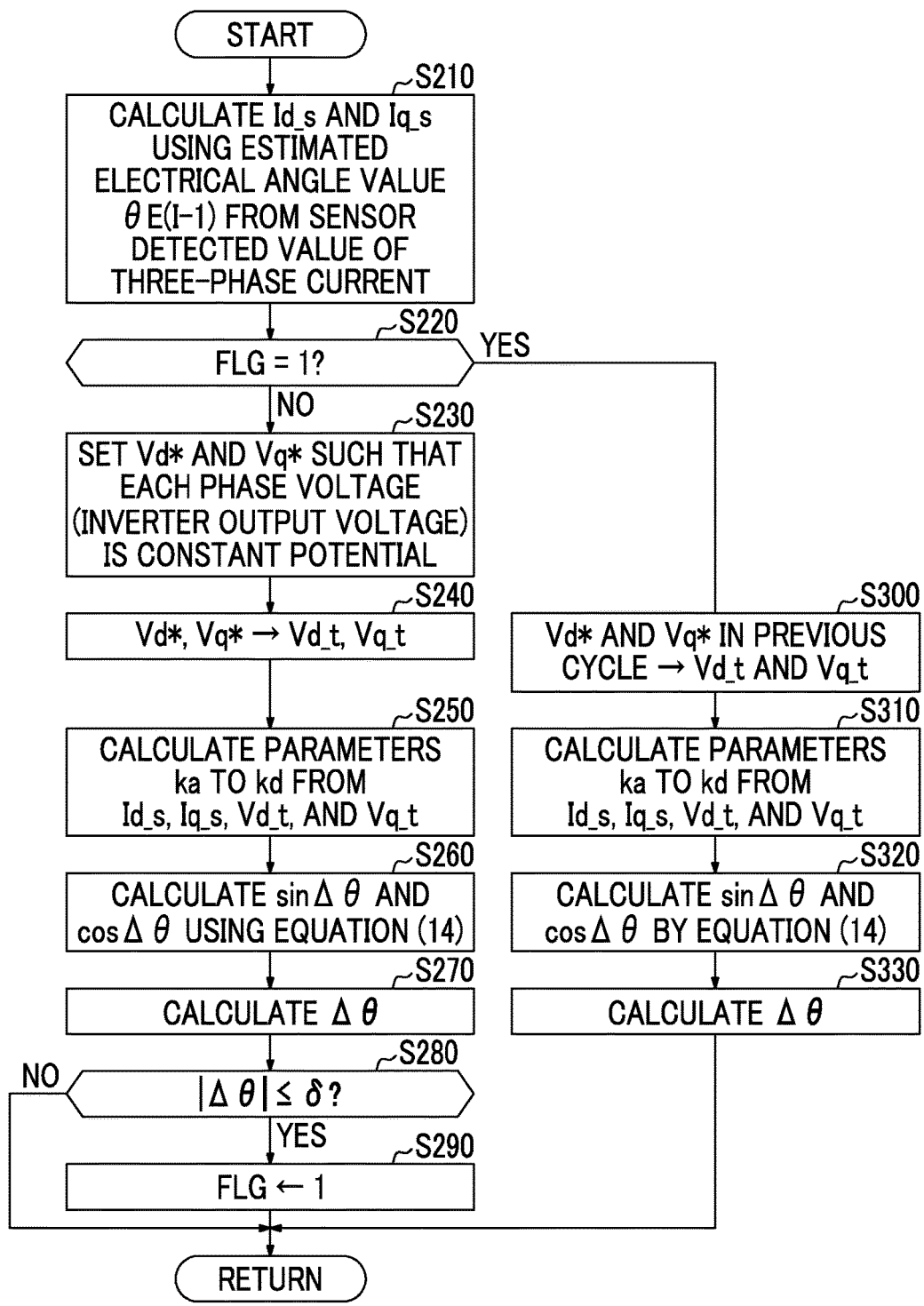
FIG. 14 is a flowchart illustrating an electrical angle estimation error calculating process which is performed in Step S130 in FIG. 9.

FIG. 14 is a flowchart illustrating a process of calculating an electrical angle estimation error Δθ which is performed in Step S130 in FIG. 9. Referring to FIG. 14, the ECU 300 calculates the d-axis current Id_s and the q-axis current Iq_s based on the sensor detected values from the three-phase currents (iu, iv, and Iw) in the current control cycle detected by the current sensor 242 by coordinate transformation (Equation 3) using the estimated electrical angle value θe(i−1) in the previous control cycle (Step S210).

Subsequently, the ECU 300 determines whether an initial value flag FLG is "1" (Step S220). The initial value flag FLG is set to "0" as a default value at the time of transitioning to the ready-ON state. The initial value flag FLG changes from "0" to "1" (which will be described later) when the electrical angle estimation error Δθ converges on zero and the initial value of the estimated electrical angle value θe is determined.

When it is determined in Step S220 that the initial value flag FLG is "0" (NO in Step S220), that is, when the initial value of the estimated electrical angle value θe is not determined, the ECU 300 sets the voltage command values Vd* and Vq* such that each phase voltage (the inverter output voltage) is a constant potential (for example, zero) (Step S230). When the initial value of the estimated electrical angle value θe is determined, the voltage command values Vd* and Vq* are generated using the estimated electrical angle value θe in accordance with the torque command value Tqcom2. When the initial value of the estimated electrical angle value θe is not determined, an overcurrent may flow in the second inverter 222 as described above with reference to FIG. 11, and thus the voltage command values Vd* and Vq* are set such that the inverter output voltage is a constant potential.

The ECU 300 sets the voltage command values Vd* and Vq* set in Step S230 as the theoretical values Vd_t and Vq_t of the voltage command values (Step S240). Then, the ECU 300 calculates the coefficients ka to kd for calculating the electrical angle estimation error Δθ by substituting Id_s and Iq_s based on the sensor detected values and acquired in Step S210 and the theoretical values Vd_t and Vq_t of the voltage command values acquired in Step S240 into Equations (10) to (13) (Step S250).

The ECU 300 calculates sin Δθ and cos Δθ by substituting the coefficient parameters ka to kd calculated in Step S250 into Equation (14) (Step S260). Then, the ECU 300 calculates the electrical angle estimation error Δθ from electrical angle sin Δθ and cos Δθ calculated in Step S260 (Step S270).

Subsequently, the ECU 300 determines whether the absolute value |Δθ| of the calculated electrical angle estimation error Δθ is equal to or less than a predetermined value δ (Step S280). This determination process is performed to determine whether the electrical angle estimation error Δθ has converged on the vicinity of zero and whether the initial value of the estimated electrical angle value θe has been accordingly determined.

Then, when it is determined in Step S280 that the absolute value |Δθ| of the calculated electrical angle estimation error Δθ is equal to or less than the predetermined value δ (YES in Step S280), the ECU 300 sets the initial value flag FLG to "1" (Step S290). Accordingly, since the determination result of Step S220 is YES in the subsequent steps, the processes of Steps S230 to S290 are not performed and the processes of Step S300 and steps subsequent thereto are performed.

When it is determined in Step S280 that the absolute value |Δθ| of the calculated electrical angle estimation error Δθ is greater than the predetermined value δ (NO in Step S280), the processes of Steps S230 to S290 are also performed in the next control cycle without setting the initial value flag FLG to "1" (with the initial value flag FLG kept at "0").

On the other hand, when it is determined in Step S220 that the initial value flag FLG is set to "1" (YES in Step S220), that is, when the initial value of the estimated electrical angle value θe has been determined, the ECU 300 sets the voltage command values Vd* and Vq* in the previous control cycle, that is, the (i−1)-th cycle, as the theoretical values Vd_t and Vq_t of the voltage command values (Step S300). Then, the ECU 300 calculates the coefficients ka to kd for calculating the electrical angle estimation error Δθ by substituting Id_s and Iq_s based on the sensor detected values and acquired in Step S210 and the theoretical values Vd_t and Vq_t of the voltage command values acquired in Step S300 into Equations (10) to (13) (Step S310).

The EU 300 calculates sin Δθ and cos Δθ by substituting the coefficient parameters ka to kd calculated in Step S310 into Equation (14) (Step S320). Then, the ECU 300 calculates the electrical angle estimation error Δθ from sin Δθ and cos Δθ calculated in Step S320 (Step S330). Thereafter, the ECU 300 restarts the process routine.

As described above, with the vehicle 1 according to this embodiment, it is possible to perform output control (resolverless control) using the estimated electrical angle value θe. Particularly, when the resolverless control is being performed, the estimated electrical angle value θe is corrected using the electrical angle estimation error Δθ which is calculated from the control command for the second inverter 222 and the actual detected current value under the influence of an error of the estimated electrical angle value θe, and thus it is possible to enhance estimation accuracy of an electrical angle. Accordingly, when an abnormality has occurred in the second resolver 422 of the second motor generator 20, the vehicle can travel with the torque output (that is, power consumption or power generation) from the second motor generator 20.

In this embodiment, since the control command for the second inverter 222 is generated such that the output of the second inverter 222 has a constant potential when the electrical angle estimation error Δθ is kept large, only a current corresponding to the counter-electromotive force generated in the second motor generator 20 flows in the second inverter 222. Accordingly, according to this embodiment, during traveling of the vehicle in a state in which an abnormality has occurred in the second resolver 422, it is possible to curb an overcurrent flowing in the second inverter 222 while continuously using the second motor generator 20.

In the embodiment, the control in a case in which an abnormality has occurred in the second resolver 422 of the second motor generator 20 (MG2) has been representatively described above, but the resolverless control can be applied to a case in which an abnormality has occurred in the first resolver 421 of the first motor generator 10 in the same way. By allowing the first motor generator 10 to output a torque by application of the resolverless control, the vehicle can continue to travel by transiting to the HV traveling (FIG. 4) including operating of the engine 100 with the decrease in SOC of the battery 150. Specifically, the output torque of the first motor generator 10 can be controlled such that the torque command value is set to Tqcom1>0 to crank the engine 100 with the decrease in SOC and the torque command value is set to Tqcom1<0 to cause the motor generator 10 to generate electric power with the output of the engine 100 after the engine has been started. Accordingly, in the traveling distance in traveling of the vehicle when an abnormality has occurred in the resolver of the first motor generator 10 can be set to be larger than that in the case in which the vehicle continues to travel with the torque output of the first motor generator 10 stopped (that is, without generation of electric power) as described in JP 2007-244126 A.

In this case, since the control command for the first inverter 221 is generated such that the output of the first inverter 221 has a constant potential when the electrical angle estimation error Δθ of the first motor generator 10 is kept large, only a current corresponding to the counter-electromotive force generated in the first motor generator 10 flows in the first inverter 221. Accordingly, even when an abnormality has occurred in the first resolver 421, it is possible to curb an overcurrent flowing in the first inverter 221 while continuously using the first motor generator 10.

Figure 15:
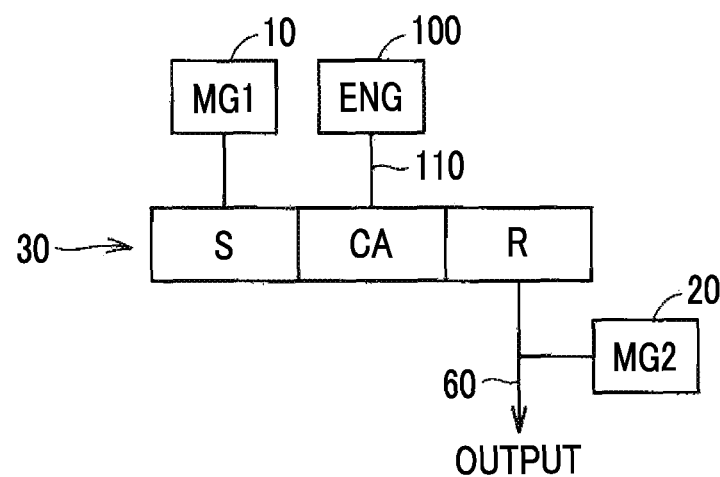
FIG. 15 is a diagram illustrating a connection relationship between the engine, the motor generators, and an output shaft in this embodiment.
Figure 16:
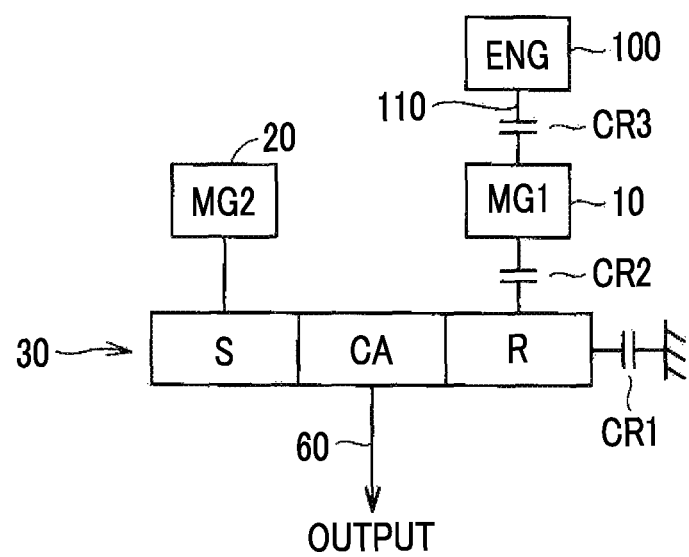
FIG. 16 is a diagram illustrating a connection relationship between the engine, the motor generators, and the output shaft in a modified example of the present disclosure.

In the above-mentioned embodiment, as illustrated in FIG. 15, the first motor generator 10 (MG1), the engine 100 (the crank shaft 110), and the output shaft 60 (the second motor generator 20 (MG2)) are connected to the sun gear S, the carrier CA, and the ring gear R of the planetary gear set 30, but the vehicle according to the present disclosure is not limited to such a configuration. For example, as illustrated in FIG. 16, the present disclosure may be applied to a vehicle in which the second motor generator 20 (MG2), the output shaft 60, and the first motor generator 10 (MG1) are connected to the sun gear S, the carrier CA, and the ring gear R of the planetary gear set 30 via a clutch CR2, the engine 100 (the crank shaft 110) is connected to the first motor generator 10 (MG1) via a clutch CR3, and a clutch CR1 that can stop rotation of the ring gear R is provided.

In the above description, the battery 150 corresponds to an example of the "power storage device" in the claims, and the ECU 300 corresponds to an example of the "electronic control unit" in the claims.

It should be understood that the embodiment disclosed herein is exemplary in all points of view and is not restrictive. The scope of the present disclosure is not limited to the above-mentioned description of the embodiment and is defined by the appended claims, and is intended to include all modifications within meanings and scopes equivalent to the claims.

What is claimed is:

1. A vehicle comprising:
   a motor generator that includes a permanent magnet in a rotor;
   an output shaft that is mechanically connected to driving wheels of the vehicle;
   a planetary gear set that is mechanically connected to at least the output shaft and a rotary shaft of the motor generator);
   an inverter configured to drive the motor generator;
   a power storage device configured to transmit and receive electric power to and from the motor generator via the inverter;
   a rotation angle sensor configured to detect a rotation angle of the motor generator;
   a current sensor configured to detect a current flowing in the motor generator; and
   an electronic control unit configured to: when the vehicle is traveling in a state in which an abnormality has occurred in the rotation angle sensor,
      (i) periodically calculate an estimated rotational angular velocity value of the motor generator from a gear ratio of the planetary gear set and a rotation speed of a rotary shaft of the planetary gear set other than the rotary shaft connected to the motor generator;
      (ii) periodically calculate an estimated electrical angle value by integrating an estimated rotation angle change value which is calculated from the estimated rotational angular velocity value;
      (iii) periodically generate a control command for the inverter based on the estimated electrical angle value in each cycle which is calculated by correcting an electrical angle error estimated and calculated from the control command for the inverter and a detected current value from the current sensor with respect to a sum of the estimated rotation angle change value between cycles and the estimated electrical angle value in a previous cycle;
      (iv) generate the control command for the inverter such that an output of the inverter is a constant potential when an absolute value of the electrical angle error is greater than a predetermined value from start of output control of the motor generator; and
      (v) control the output of the motor generator based on the control command for the inverter.

2. The vehicle according to claim 1, wherein the electronic control unit is configured to generate the control command such that an output voltage of the inverter becomes zero while the absolute value of the electrical angle error is greater than the predetermined value from the start of the output control of the motor generator during traveling of the vehicle.

3. A control method for a vehicle, the vehicle including:
   a motor generator that includes a permanent magnet in a rotor;
   an output shaft that is mechanically connected to driving wheels of the vehicle;
   a planetary gear set that is mechanically connected to at least the output shaft and a rotary shaft of the motor generator;
   an inverter configured to drive the motor generator;
   a rotation angle sensor configured to detect a rotation angle of the motor generator; and
   a current sensor configured to detect a current flowing in the motor generator, the control method comprising:
      when the vehicle is traveling in a state in which an abnormality has occurred in the rotation angle sensor,
      (i) periodically calculating an estimated rotational angular velocity value of the motor generator from a gear ratio of the planetary gear set and a rotation speed of a rotary shaft of the planetary gear set other than the rotary shaft connected to the motor generator;
      (ii) periodically calculating an estimated electrical angle value by integrating an estimated rotation angle change value which is calculated from the estimated rotational angular velocity value;
      (iii) periodically generating a control command for the inverter based on the estimated electrical angle value in each cycle which is calculated by correcting an electrical angle error estimated and calculated from the control command for the inverter and a detected current value from the current sensor with respect to a sum of the estimated rotation angle change value between cycles and the estimated electrical angle value in a previous cycle;
      (iv) generating the control command for the inverter such that an output of the inverter is a constant potential while an absolute value of the electrical angle error is greater than a predetermined value from start of output control of the motor generator; and
      (v) controlling the output of the motor generator based on the control command for the inverter.

* * * * *